(12) United States Patent
Ozawa

(10) Patent No.: US 8,619,333 B2
(45) Date of Patent: Dec. 31, 2013

(54) IMAGE FORMING APPARATUS, IMAGE FORMING APPARATUS CONTROL METHOD, AND PROGRAM

(75) Inventor: Shuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 633 days.

(21) Appl. No.: 12/778,979

(22) Filed: May 12, 2010

(65) Prior Publication Data

US 2010/0302564 A1 Dec. 2, 2010

(30) Foreign Application Priority Data

Jun. 2, 2009 (JP) .................... 2009-133456

(51) Int. Cl.
*H04N 1/40* (2006.01)
(52) U.S. Cl.
USPC ......................... 358/3.15; 358/3.27
(58) Field of Classification Search
USPC .......... 358/1.9, 2.1, 3.15, 3.27, 400, 500, 468
See application file for complete search history.

(56) References Cited

U.S. PATENT DOCUMENTS

| | | | | |
|---|---|---|---|---|
| 7,279,695 | B2 * | 10/2007 | Oguri ..................... | 250/559.36 |
| 7,308,334 | B2 * | 12/2007 | Tasker et al. ............... | 700/180 |
| 7,720,315 | B2 * | 5/2010 | Mirtich et al. .............. | 382/309 |
| 2006/0028701 | A1 | 2/2006 | Suzuki | |

FOREIGN PATENT DOCUMENTS

| | | |
|---|---|---|
| CN | 1444907 A | 10/2003 |
| CN | 101046883 A | 10/2007 |
| CN | 101137011 A | 3/2008 |
| JP | 11-157147 A | 6/1999 |
| JP | 2001331806 A * | 11/2001 |

OTHER PUBLICATIONS

Chinese Office Action dated Sep. 17, 2013 in corresponding Chinese Patent Application No. 201210466846.5.

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

An image forming apparatus includes a reception unit which receives an electronic document, a generation unit which generates a display list containing edge information indicating the outline of an object contained in the received electronic document, fill information for controlling whether to fill in the inside of the outline of the object, and control information for controlling image formation of each page that forms the electronic document, an edge position extraction unit which obtains the intersections of the object and the line based on the edge information, and extracts the positions of the edges of the object on the line, and a setting unit which sets, based on the data amount of extracted edges and the data amount of edges in the page that is predicted by analyzing the control information, a threshold for controlling extraction of the edges to fall within a predetermined data amount.

35 Claims, 23 Drawing Sheets

FIG. 5
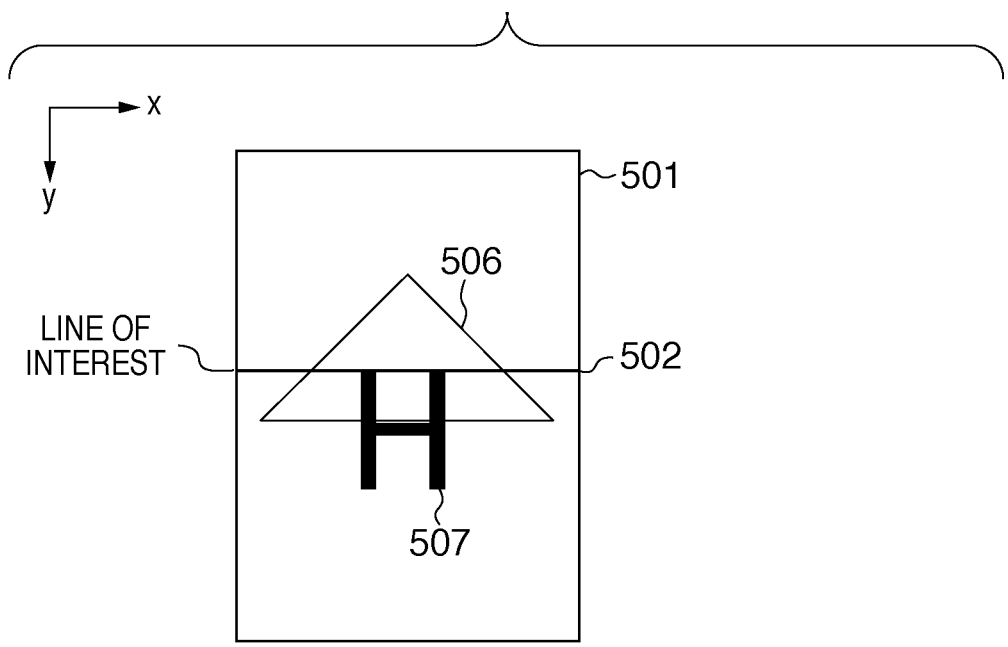
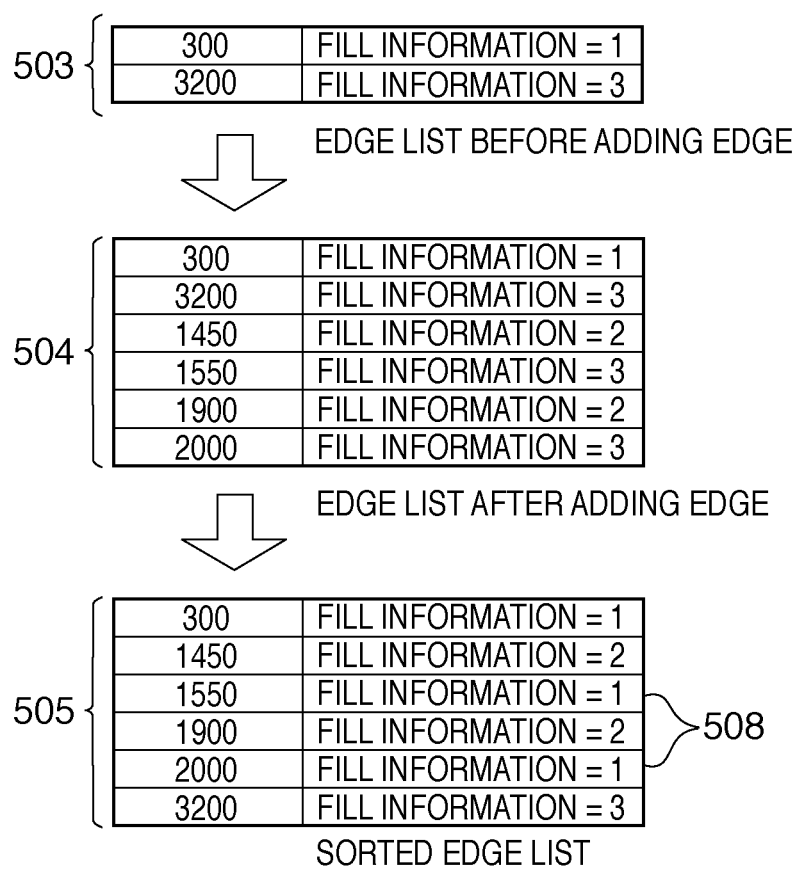

FIG. 9
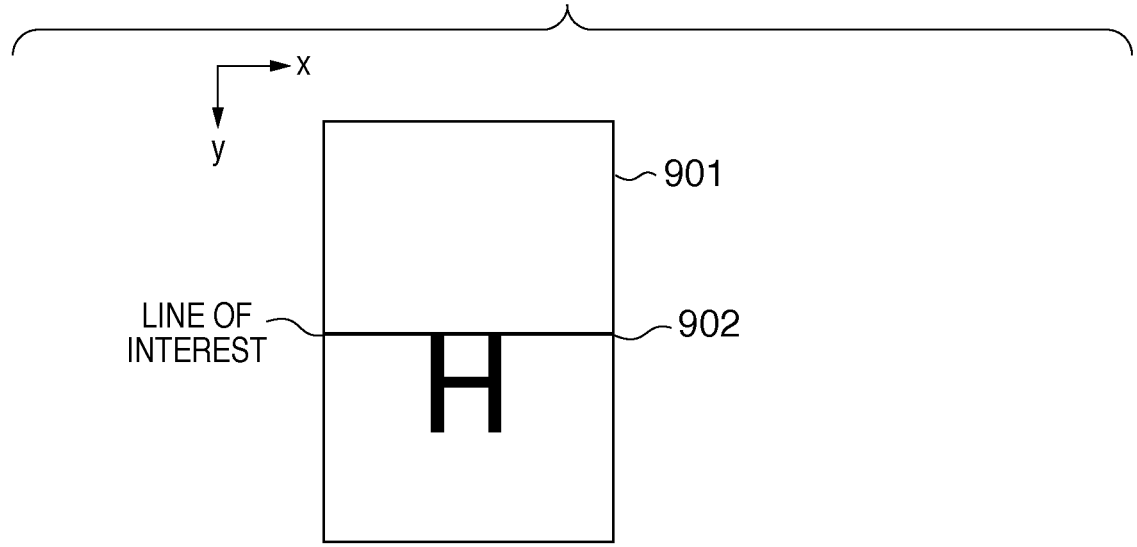
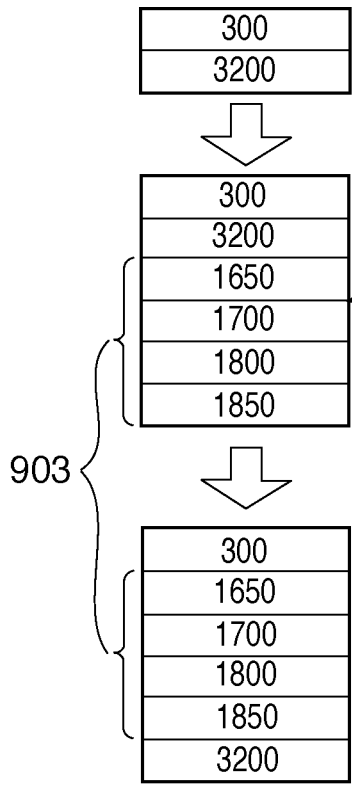
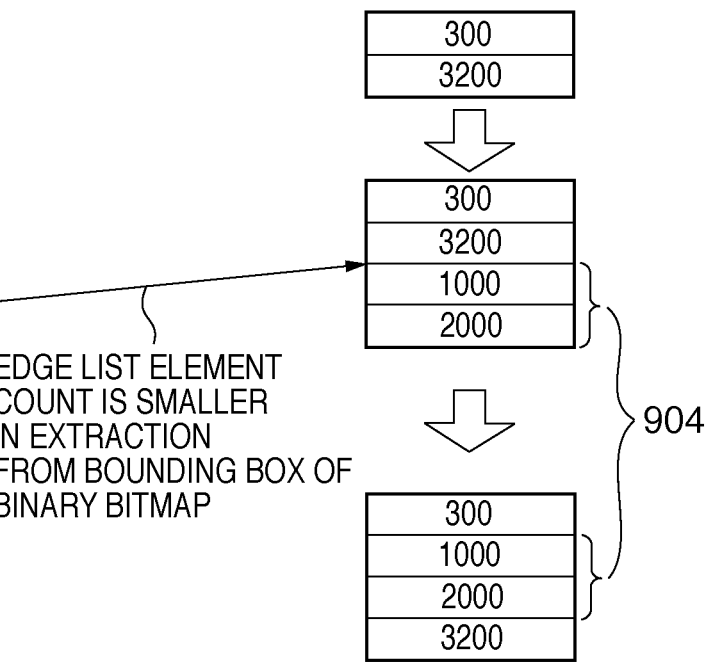

FIG. 15A
FIG. 15B
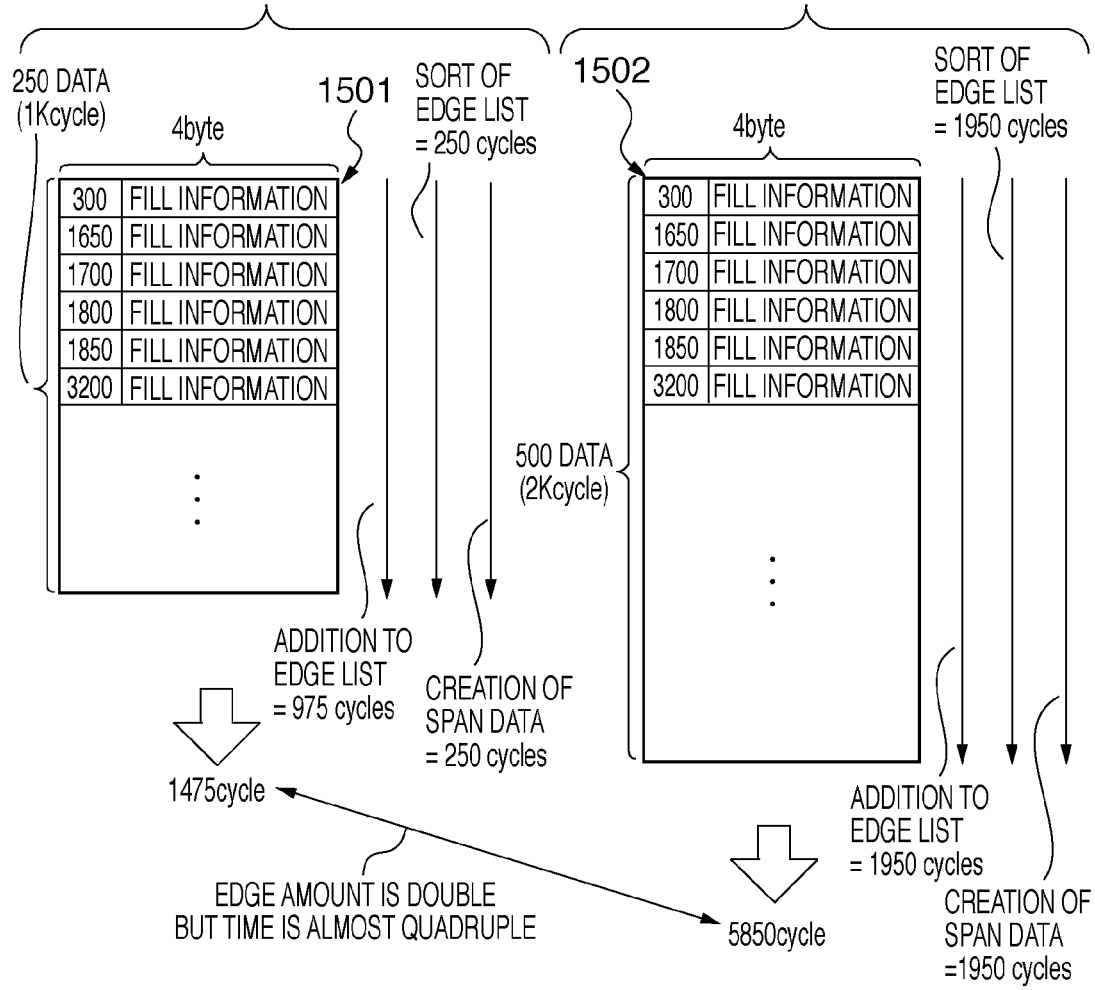
FIG. 15C
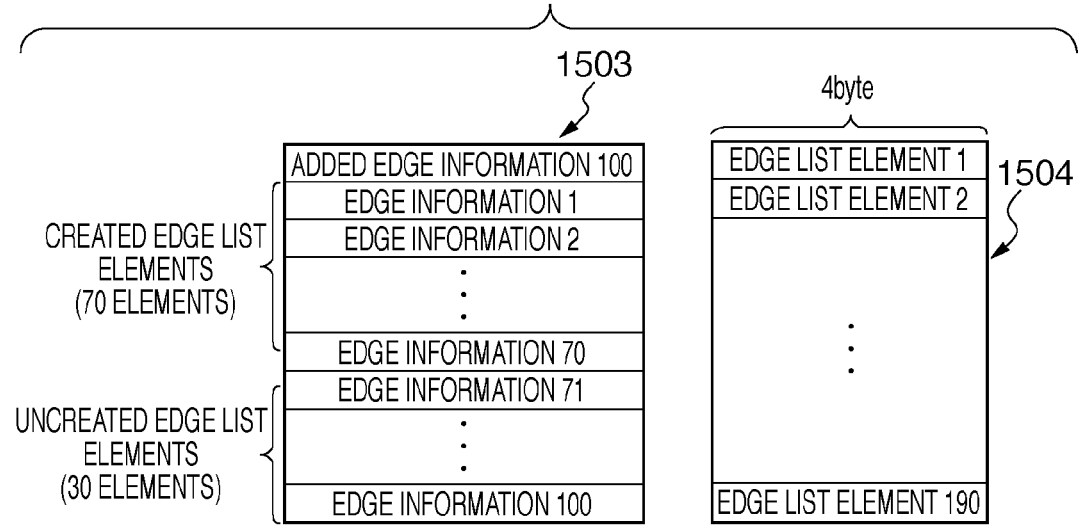

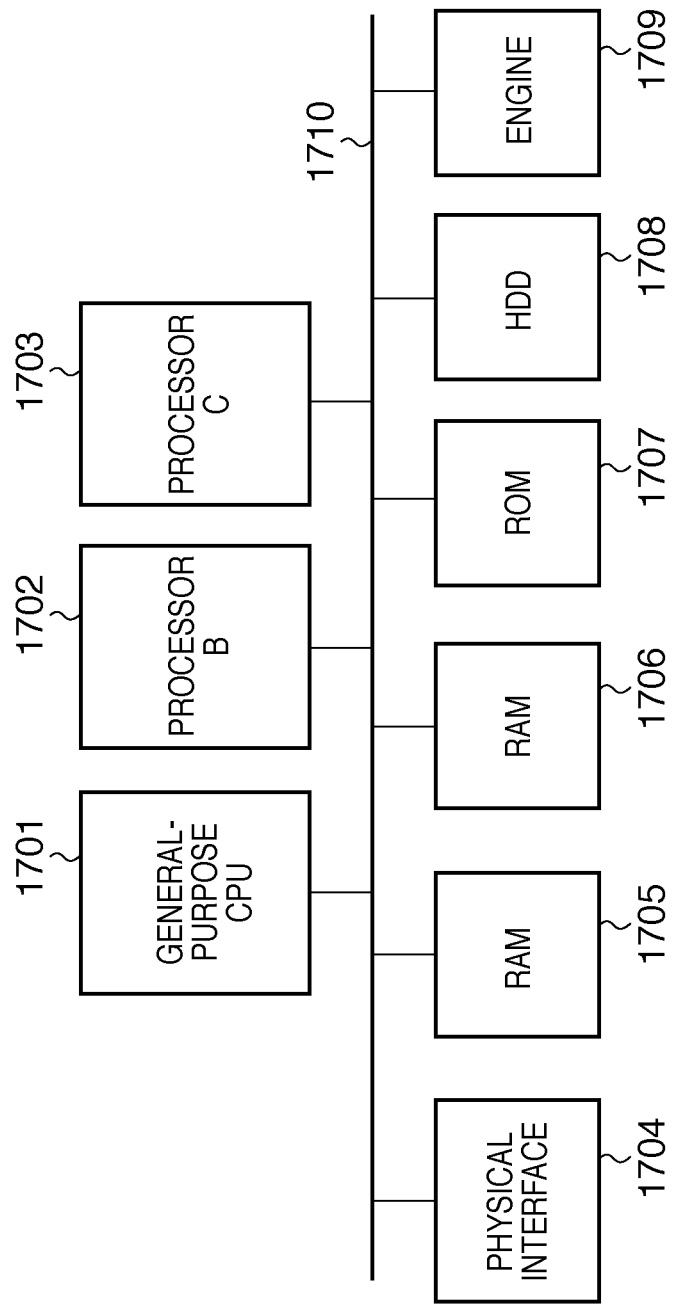

FIG. 20
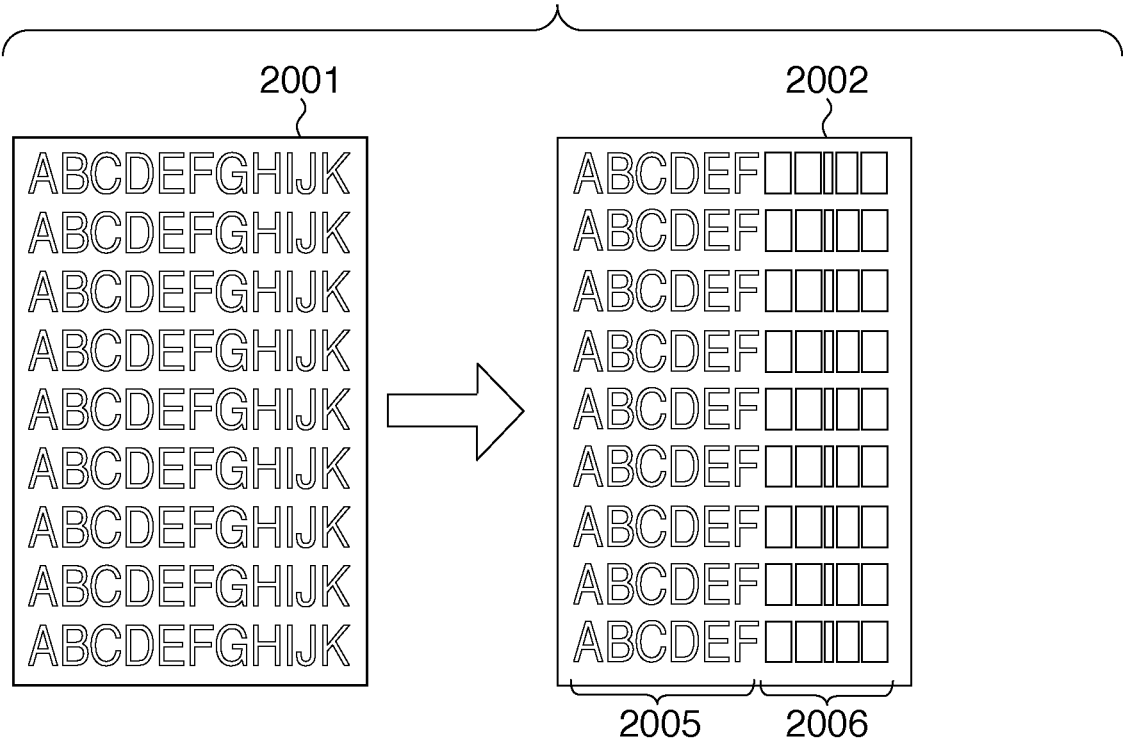
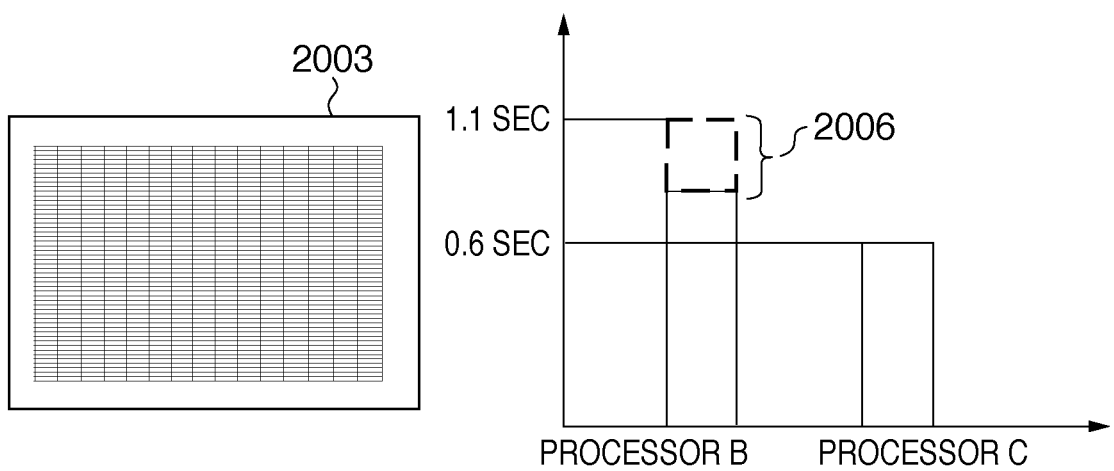

FIG. 21
PROCESSOR C DOES NOT PROCESS BACKGROUND OF "H".
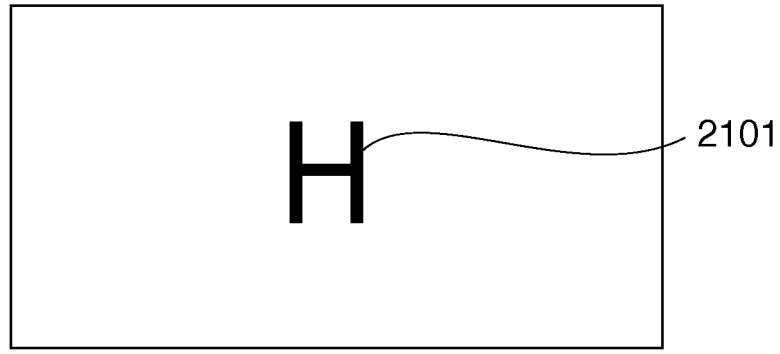
2101
PROCESSOR C PROCESSES BACKGROUND OF "H".
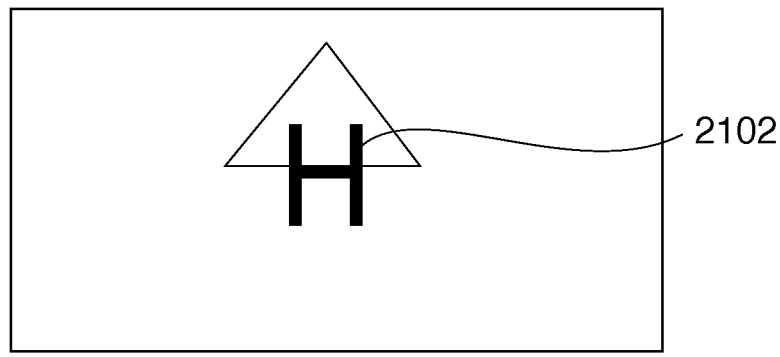
2102
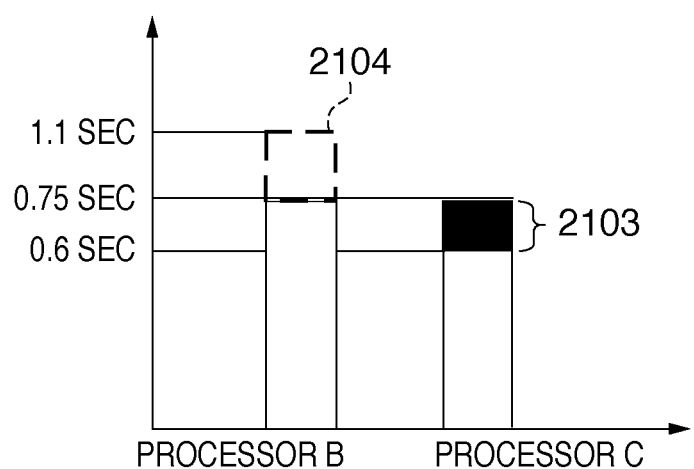

IMAGE FORMING APPARATUS, IMAGE FORMING APPARATUS CONTROL METHOD, AND PROGRAM

BACKGROUND OF THE INVENTION

1. Field of the Invention

The present invention relates to an image forming apparatus, an image forming apparatus control method, and a program.

2. Description of the Related Art

There is processing of forming an image from an electronic document or PDL data made up of a plurality of image objects (e.g., a text, image, and graphics). When a scan line renderer executes the image forming processing, it analyzes an electronic document or PDL data to generate a display list processable by the scan line renderer. The scan line renderer analyzes the display list and stores a formed image in a page memory. The display list of the scan line renderer holds, as edge information, each image object contained in the electronic document or the like and the right and left outlines of each image object.

Then, the scan line renderer pays attention to one line in a page and extracts the X-coordinate of the intersection of each image object and the line of interest (edge list). The scan line renderer renders one line as a scan line from left to right. The X-coordinate of the left end of the page is defined as a minimum X-coordinate, and the scan line renderer sorts the extracted X-coordinates of intersections in the edge list. The scan line renderer extracts the length $\Delta X$ of the section (to be referred to as a "span") between intersections from the sorted edge list in ascending order of the X-coordinate. The scan line renderer sets an intersection at the left end of the span as a start point. The scan line renderer renders the span in a predetermined page memory using the extracted start point and $\Delta X$. In the span, a text, image, or graphics is rendered depending on the contents of the object.

Some scan line renderers can register a binary bitmap as edge information. The edge information registered in the binary bitmap is mainly a character object (bitmap font). When a binary bitmap is registered as edge information, the scan line renderer extracts the outline of a pattern in the binary bitmap and sets it as edge information. The scan line renderer registers, in the edge list, the intersection of the edge information extracted from the binary bitmap and one line of a page of interest. At this time, a problem arises when an electronic document or PDL data contains many character objects, like form data, or many graphics objects and the like are contained in addition to character objects. More specifically, a long time is taken to generate and sort an edge list by the scan line renderer, decreasing the image forming speed. To solve this, for example, Japanese Patent Laid-Open No. 11-157147 discloses a method of parallel-executing respective processes by arranging a plurality of circuits which generate and sort an edge list.

SUMMARY OF THE INVENTION

However, to achieve this method, it is necessary to prepare dedicated hardware or arrange a plurality of CPUs, which increases the number of manufacturing steps and the cost. Some recent techniques maintain the processing speed while decreasing the cost by a CPU multiprocessor configuration using configurable processors and the like. In this case, each configurable processor is specialized in specific processing to a certain degree to increase the processing speed and decrease the cost. However, not all processes can be speeded up. Even if each processor is specialized in specific processing to a certain degree, a higher speed, like hardware, cannot be attained while decreasing the cost.

The present invention has been made to solve the above problems, and has as its object to provide an image forming technique capable of quickly performing rendering processing for an electronic document or PDL data containing many character objects and graphics objects.

According to one aspect of the present invention, there is provided an image forming apparatus comprising: a reception unit adapted to receive an electronic document; a generation unit adapted to generate a display list containing edge information indicating an outline of an object contained in the electronic document received by the reception unit, fill information for controlling whether to fill in an inside of the outline of the object, and control information for controlling image formation of each page that forms the electronic document; and an edge position extraction unit adapted to, when performing scan line rendering processing for an object in a page of the electronic document for each line, obtain intersections of the object and the line based on the edge information, and extract positions of edges of the object on the line, wherein when the number of edges extracted by the edge position extraction unit becomes not smaller than a threshold, the edge position extraction unit sets a rectangular region which surrounds the object, and extracts edges of the object on the line from intersections of the rectangular region and the line.

According to another aspect of the present invention, there is provided an image forming apparatus control method comprising: a reception step of receiving an electronic document; a generation step of generating a display list containing edge information indicating an outline of an object contained in the electronic document received in the reception step, fill information for controlling whether to fill in an inside of the outline of the object, and control information for controlling image formation of each page that forms the electronic document; and an edge position extraction step of, when performing scan line rendering processing for an object in a page of the electronic document for each line, obtaining intersections of the object and the line based on the edge information, and extract positions of edges of the object on the line, wherein in the edge position extraction step, when the number of edges extracted in the edge position extraction step becomes not smaller than a threshold, a rectangular region which surrounds the object is set, and edges of the object on the line are extracted from intersections of the rectangular region and the line.

According to still another aspect of the present invention, there is provided an image forming apparatus comprising: a first processor which determines whether the number of edges contained in one line exceeds a threshold, when determining that the number of edges contained in one line does not exceed the threshold, extracts edge information of an outline of an object, and when determining that the number of edges contained in one line exceeds the threshold, extracts edge information of a bounding box of the object; and a second processor which, when the edge information of the outline of the object is extracted, performs rendering without a comparison with a background, and when the edge information of the bounding box of the object is extracted, performs rendering while performing a comparison with the background.

According to the present invention, rendering processing can be done quickly for an electronic document or PDL data containing many character objects and graphics objects.

Further features of the present invention will become apparent from the following description of exemplary embodiments (with reference to the attached drawings).

BRIEF DESCRIPTION OF THE DRAWINGS

FIG. 5 is a view for explaining edge list sort processing;
FIG. 9 is a view for explaining processing of extracting, as an edge position, the intersection position of the bounding box of a binary bitmap and a line;
FIGS. 15A to 15C are views for explaining a change of the cycle of access to the edge list;
FIG. 17 is a block diagram for explaining an example of a system configuration using configurable processors;
FIG. 20 is a view for explaining processing by the rendering unit;
and
FIG. 21 is a view for explaining processing by the rendering unit.

DESCRIPTION OF THE EMBODIMENTS (First Embodiment)

Figure 1:
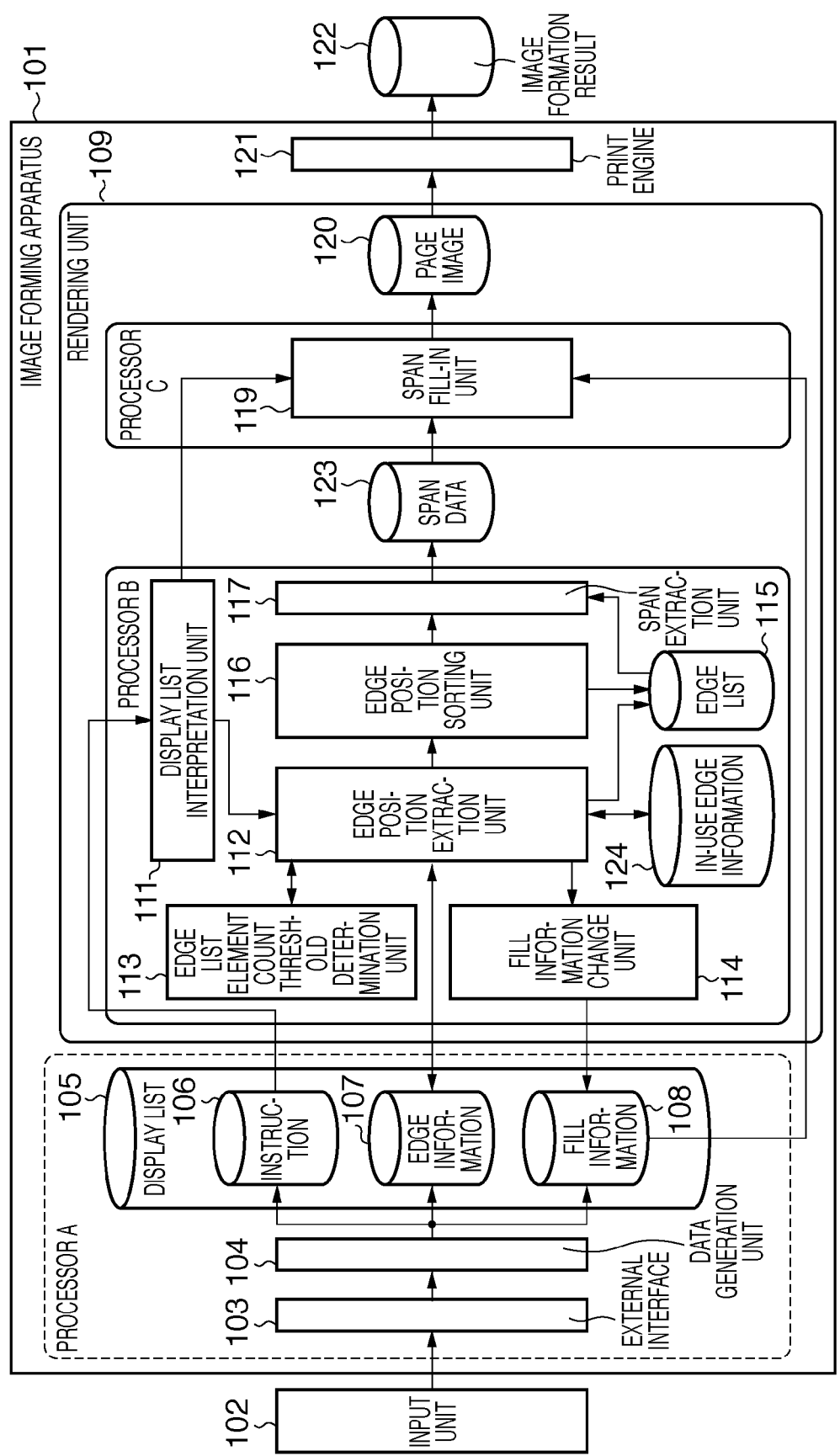
FIG. 1 is a block diagram showing the schematic arrangement of an image forming apparatus.

The arrangement of an image forming apparatus according to the first embodiment will be described with reference to FIG. 1. An image forming apparatus 101 forms the image of an electronic document or PDL data input from an input unit 102. The input unit 102 can input data to the image forming apparatus by receiving data from a network or connecting a USB memory or the like. The image forming apparatus 101 includes three CPUs (processors A, B, and C), a RAM, a ROM, and a hard disk (to be referred to as an "HDD"). Data input from the input unit 102 is input to a data generation unit 104 via an external interface 103. The data generation unit 104 analyzes the input data to generate data (display list 105) for a rendering unit. Of the three processors, processor A is used for processing of the external interface 103 and execution of the data generation unit 104. The two remaining processors B and C are used to execute processing by a rendering unit 109 which forms an actual page image 120 based on the display list 105 generated by the data generation unit 104. The rendering unit 109 can perform scan line rendering processing for an object in a page of an electronic document, PDL file, or the like for each line.

Data processed by executing the three processors A, B, and C are stored in any storage unit among the ROM, RAM, and HDD. Each processor individually reads out data and executes predetermined processing. Note that the storage unit may be an externally connected memory such as a USB memory. The storage unit stores a program for causing a computer to execute an image forming apparatus control method according to the embodiment of the present invention.

The display list 105 generated by the data generation unit 104 contains an instruction 106, edge information 107, and fill information 108. The instruction 106 contains control information of an entire page. The edge information 107 contains outline information of an object. The fill information 108 contains information for controlling whether to fill in the inside of the outline of an object. The display list 105 is stored in a storage unit such as the RAM, ROM, or HDD.

The rendering unit 109 reads data of the display list 105 and forms the page image of an electronic document. Processor B (first processor) of the rendering unit 109 controls execution of processes by units from a display list interpretation unit 111 to a span extraction unit 117 in order to generate an edge list 115 and generate (extract) span data 123. Processor C (second processor) controls execution of processing by a span fill-in unit 119 which reads the span data 123 extracted by processor B and generates a page image. Processors B and C parallel-run and perform pipeline processing by transferring the span data 123.

The following processing is executed under the control of processor B (first processor). The display list interpretation unit 111 interprets control information which is contained in the instruction 106 and used to control image formation of an entire page, and invokes an edge position extraction unit 112 for each line. Based on edge information, the edge position extraction unit 112 obtains the intersections of an object and one line, and extracts the edge positions of the object on one line, generating the edge list 115. Edge position data are arranged at random and stored in the edge list 115 generated by the edge position extraction unit 112. Thus, an edge position sorting unit 116 sorts the edge position data. For example, the X-coordinate of the left end of a page is defined as a minimum X-coordinate, and the edge position sorting unit 116 sorts the edge position data. The span extraction unit 117 reads data of the sorted edge list 115. The span extraction unit 117 extracts the section between edge positions as a span, generating the span data 123.

When an electronic document or PDL data contains many objects, a page contains an enormous number of outlines of objects. As a result, the processing amounts of the edge position extraction unit 112, edge position sorting unit 116, and span extraction unit 117 increase, decreasing the processing speed.

Based on the data amount of extracted edges, and the data amount of edges in a page that is predicted by analyzing control information, an edge list element count threshold determination unit 113 sets a threshold for controlling extraction of edges to fall within a range of predetermined data amounts. The edge list element count threshold determination unit 113 can control the threshold setting in accordance with the remaining capacity storable in a memory which stores extracted edge information (edge list). For example, if the remaining capacity of the memory decreases upon storing an extracted edge list in the memory, the edge list element count threshold determination unit 113 updates the threshold setting based on the decrease in remaining capacity. The edge list element count threshold determination unit 113 monitors the generated edge list element count (edge data amount). When the generated edge list element count exceeds an edge list element count (threshold list element count) at which the processing speed decreases, the edge list element count threshold determination unit 113 instructs the edge position extraction unit 112 to suppress generation of the edge list. The edge position extraction unit 112 rewrites the edge information 107 and fill information 108 so as to be able to suppress generation of the edge list 115 and form an image. After rewriting the edge information 107 and fill information 108, the edge position extraction unit 112 generates the edge list 115 for forming an image.

The following processing is executed under the control of processor C (second processor). The span fill-in unit 119 reads the span data 123 and generates the page image 120 based on the span data 123. The page image 120 is stored in a storage unit such as the RAM or HDD. When the fill information 108 indicates simple single-color fill-in, the span data 123 describes this information, so the span fill-in unit 119 need not access the fill information 108. However, for an image object, the span fill-in unit 119 accesses the fill information 108 and obtains the entity of the image object. After the end of processing one page by the rendering unit 109, a print engine 121 processes the page image 120, outputting an image formation result 122 on an actual sheet.

The edge information 107 in the display list 105 includes all pieces of edge information contained in a page. When the edge position extraction unit 112 pays attention to one line to extract edge positions, it uses not all but some pieces of edge information contained in the page. The edge position extraction unit 112 saves currently used edge information in in-use edge information 124.

The detailed structure of the display list 105 in FIG. 1 will be explained with reference to FIG. 2. An image formation result 219 represents an image formation result expressed by the display list using pieces of information from a page start instruction 201 to a fill type 218. The page start instruction 201 to a page end instruction 213 are data corresponding to the instruction 106 (FIG. 1). The instruction 106 includes control instructions such as the page start instruction 201 and page end instruction 213, size information of an entire page such as a page width 203 and page height 204, and image formation information represented by data from an edge loading and rendering start instruction 205 to edge information 212. The edge loading and rendering start instruction 205 is data which designates image formation of a partial image 222 contained in the image formation result 219. A rendering height 206 is 1,250 lines. The partial image 222 of the image formation result 219 does not contain an object, so an added edge information count 207 is "0". In rendering processing according to the embodiment, a section containing no edge information is filled in according to an undercolor 202.

A next edge loading and rendering start instruction 208 is data which designates image formation of a partial image 223 contained in the image formation result 219. The partial image 223 contains a "triangle" graphics 220 filled in "gray". The triangle has right and left pieces of edge information, and the added edge information count is two. Two pieces of added edge information 209 are stored in edge information 1 and edge information 2, respectively. Edge information 214a and edge information 214b contain pieces of information corresponding to edge information 1 and edge information 2, respectively. Edge information 1 and edge information 2 are registered in the in-use edge information 124.

The edge information 214a corresponding to the left side of the "triangle" is associated with "gray" fill information 216. The edge information 214b corresponding to the right side of the "triangle" is associated with "transparent" fill information 218. Rendering processing is done sequentially from the left of a page. It is determined to start filling in "gray" when the rendering processing exceeds the left edge position of the "triangle, stop filling in "gray" when it exceeds the right edge position, and paint a background color in accordance with "transparent". The background color is an undercolor if there is no other underlying object, and the undercolor 202 is painted. If there is another underlying object, the color of the object is painted.

The partial image 223 in the image formation result 219 contains the "black" character 220 of "H". Thus, edge information 210 stores edge information 3 corresponding to the "black" character 220. Edge information 3 is associated with edge information 215 of a binary bitmap. Edge information 3 is further associated with a binary bitmap entity 230 via a pointer in the edge information 215 of the binary bitmap. The edge information 215 designates fill information 217 to fill the inside of the outline of the graphics in the binary bitmap entity 230. In rendering processing according to the embodiment, the fill type is "transparent" for the outside of the outline of the graphics in the binary bitmap entity 230.

For a partial image 224 in the image formation result 219, the "triangle" graphics 220 need not be rendered. Hence, the instruction includes a deleted edge information count 211 and information 212 designating which edge information is deleted from the in-use edge information 124. In this case, edge information 1 and edge information 2 are deleted from the in-use edge information 124.

Similarly, for a partial image 225 in the image formation result 219, even the "black" character 220 of "H" need not be rendered, so edge information 3 is deleted from the in-use edge information 124.

Figure 3:
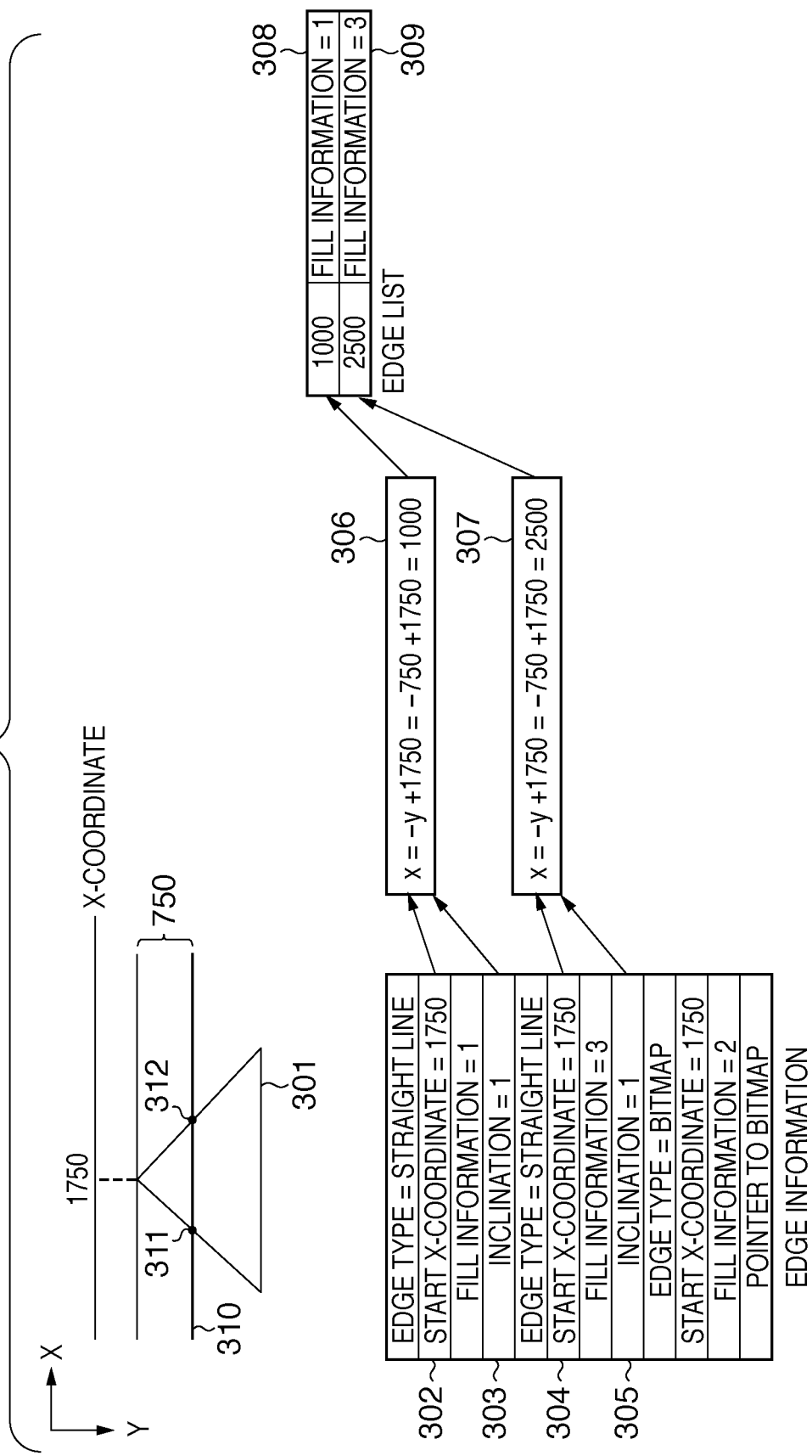
FIG. 3 is a view for explaining edge list creation processing.

Processing of creating an edge list from edge information of a graphics by the edge position extraction unit 112 will be described with reference to FIG. 3. The edge position extraction unit 112 adds, to the edge list, a left position 311 and right position 312 where a line 310 and the outline of a triangle 301 cross each other. Left edge information of the triangle 301 has an inclination 303 along which an X-coordinate 302 (=1750) of the vertex coordinates of the triangle is decremented by "−1" every time the Y-coordinate is incremented by "1" along the Y-axis.

When the moving amount along the Y-axis is "750", the left edge position where the line 310 and the outline of the triangle 301 cross each other is given by an equation 306 (x=−y+1750=−750+1750=1000). The edge position extraction unit 112 adds the calculated left edge position coordinate "1000" to an edge list element 308.

Right edge information of the triangle 301 has an inclination 305 along which an X-coordinate 304 (=1750) of the vertex coordinates of the triangle is incremented by "+1" every time the Y-coordinate is incremented by "1" along the Y-axis. When the moving amount along the Y-axis is "750", the right edge position where the line 310 and the outline of the triangle 301 cross each other is given by an equation 307 (x=y+1750=750+1750=2500). The edge position extraction unit 112 adds the calculated right edge position coordinate "2500" to an edge list element 309. The edge list elements 308 and 309 contain information (fill information=1 and fill information=3) for accessing fill information associated with edge information. This is because if the span extraction unit 117

(FIG. 1) cannot obtain the relationship between an edge list element and fill information, how to fill in a span cannot be grasped.

Figure 4:
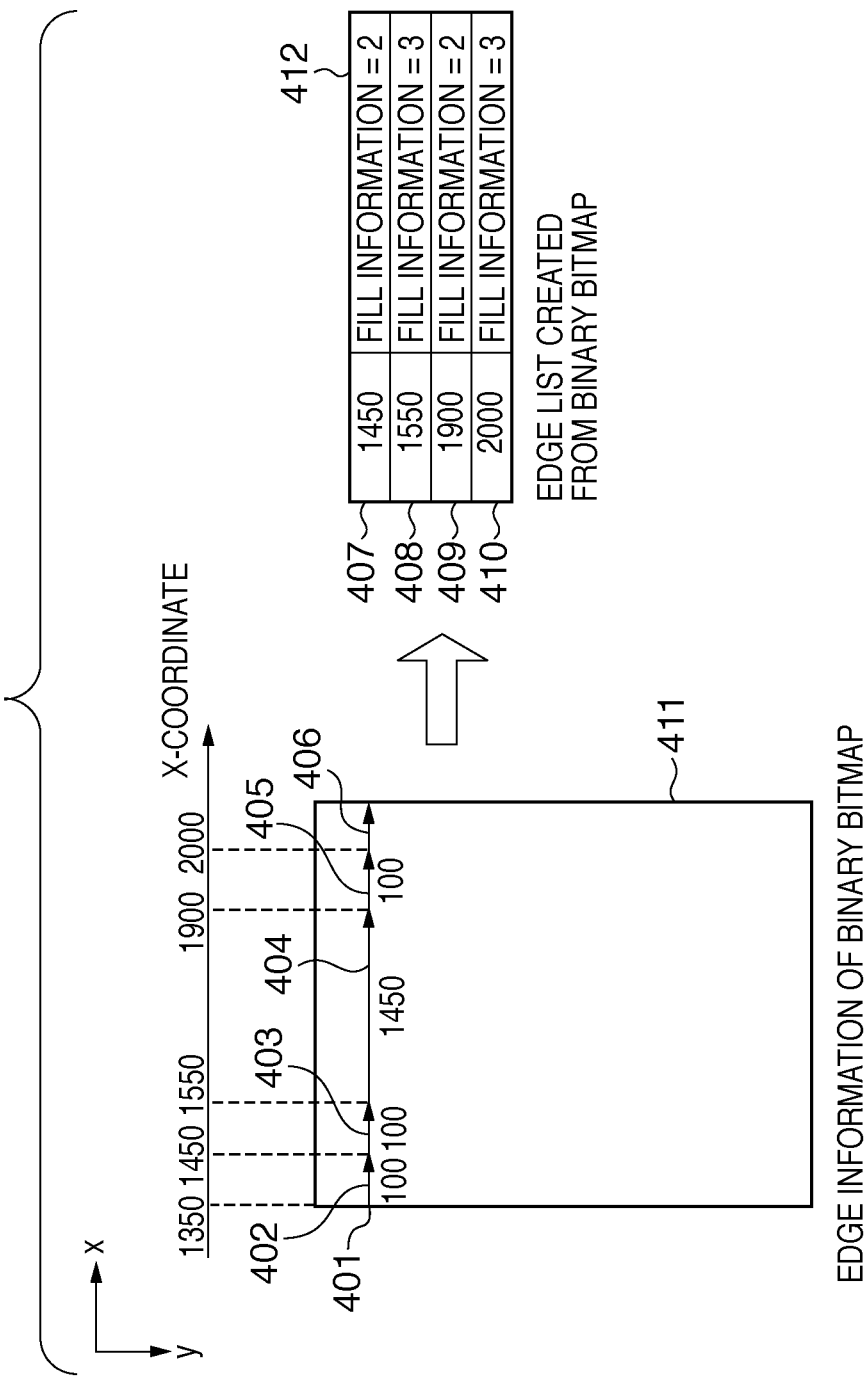
FIG. 4 is a view for explaining processing of extracting an edge list from a binary bitmap.

Processing of creating an edge list from edge information of a binary bitmap by the edge position extraction unit 112 will be described with reference to FIG. 4. The X-coordinate=1350 at an upper left end 401 of a binary bitmap 411 is defined as an origin. The edge position extraction unit 112 scans the binary bitmap 411 to extract, as an edge list element, a coordinate at which the bit of the binary bitmap 411 changes from "0" to "1" or from "1" to "0".

In 402, "1" is detected after a run of "0"s in 100 pixels, and the edge position=1450 (1350+100) is written in an edge list element 407. Similarly, the binary bitmap 411 is scanned in order of 403, 404, and 405, and edge positions are added to edge list elements 408, 409, and 410. After scanning of the binary bitmap 411 in 406, the scan position reaches the right end of the binary bitmap 411. Thus, extraction of edge list elements from the binary bitmap 411 on this line ends. The edge list elements extracted from the binary bitmap 411 contain information 412 (fill information=2, 3, . . . ) for accessing fill information associated with edge information. This is because if the span extraction unit 117 shown in FIG. 1 cannot obtain the relationship between an edge list element and fill information, how to fill in a span cannot be grasped.

An operation of sorting, by the edge position sorting unit 116, the edge list 115 generated by the edge position extraction unit 112 in ascending order of the X-coordinate position will be explained with reference to FIG. 5. A case in which an image formation result 501 is output will be examined. At the start of rendering one line 502, the edge position extraction unit 112 adds coordinate information 504 of intersections of the line 502 and the outline of a graphics in the binary bitmap of "H" to an edge list 503 in which the right and left edge positions of a triangle 506 have been registered. When the intersection coordinate information 504 is added to the edge list 503, X-coordinate positions are arranged at random. Thus, the edge position sorting unit 116 sorts the edge list into an edge list 505 so that the X-coordinate positions are arranged in ascending order.

Pieces of information 508 for accessing fill information contained in the edge list 505 indicate outer edges of the outline in the binary bitmap, and the background or undercolor need to appear. Since the outer edges fall within the triangle object, the edge position sorting unit 116 rewrites the fill information from "3" to "1" so as to refer to the same fill information as that of the inside of the triangle.

Figure 6:
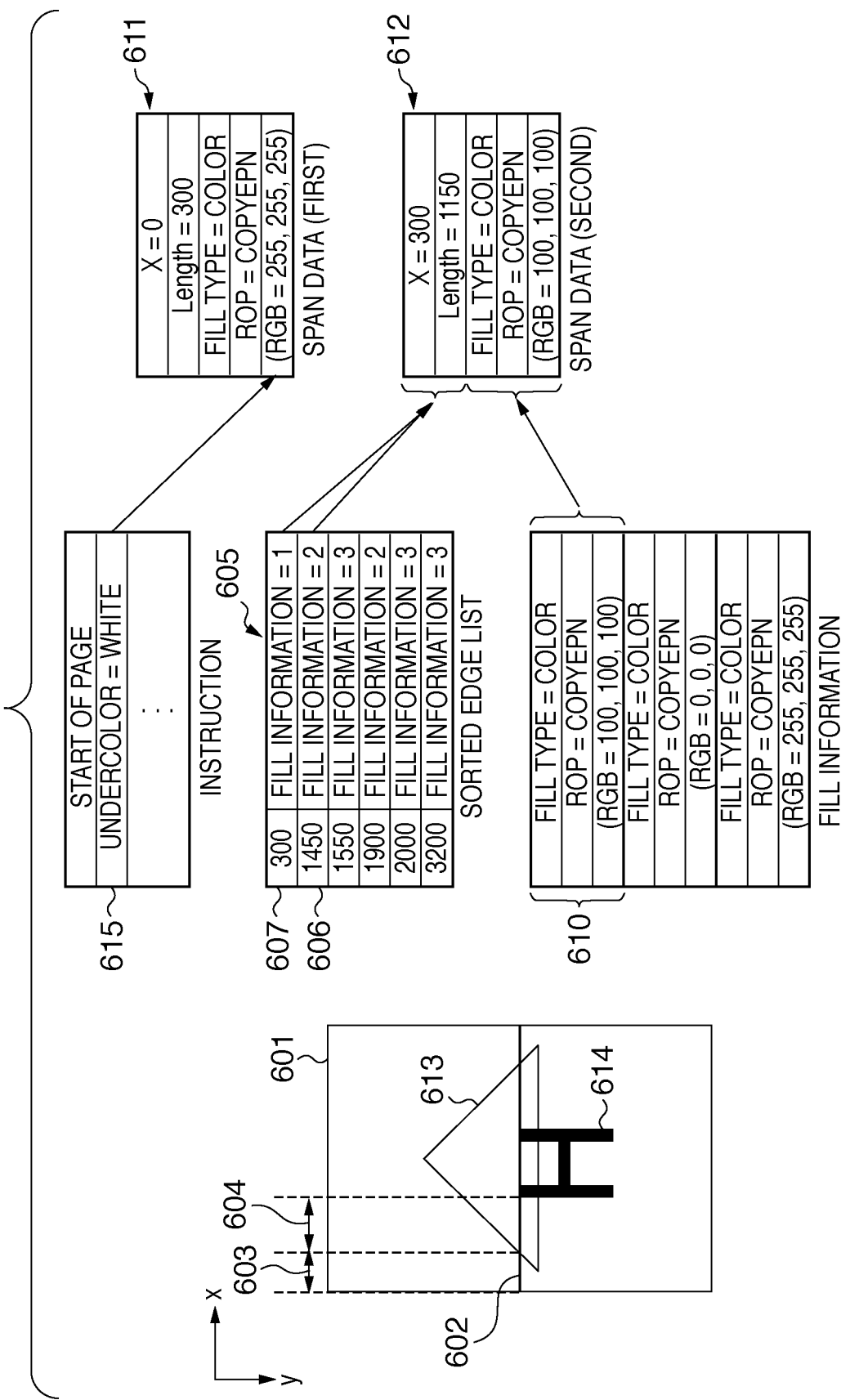
FIG. 6 is a view for explaining span data generation processing.

Processing of generating the span data 123 by the span extraction unit 117 using the sorted edge list (FIG. 5) and fill information will be explained with reference to FIG. 6. A case in which an image formation result 601 is output will be examined. For a section 603 between the left end point of one line 602 and the intersection of the line 602 and a triangle 613, the span extraction unit 117 generates span data 611 based on the X-coordinate=0 at the left end of the page and the X-coordinate=300 in a sorted edge list element 607. The rendering start position of the span data 611 is the X-coordinate=0, and the length of the span (section) is 300 pixels. The section 603 does not contain an object to form an image, so an undercolor 615 described in the instruction is directly rendered.

For a section 604, the span extraction unit 117 generates span data 612 based on the edge list element 607 of the intersection of the line 602 and the left end of the triangle 613, and an edge list element 608 of the first intersection of the line 602 and a binary bitmap 614. In the span data 612, the end point of the coordinate in the edge list element 607=300 serves as a rendering start X-coordinate. The span length is obtained by subtracting the coordinate in the edge list element 607 from that in the edge list element 608. Fill information 610 is set in the span data 612.

Figure 7:
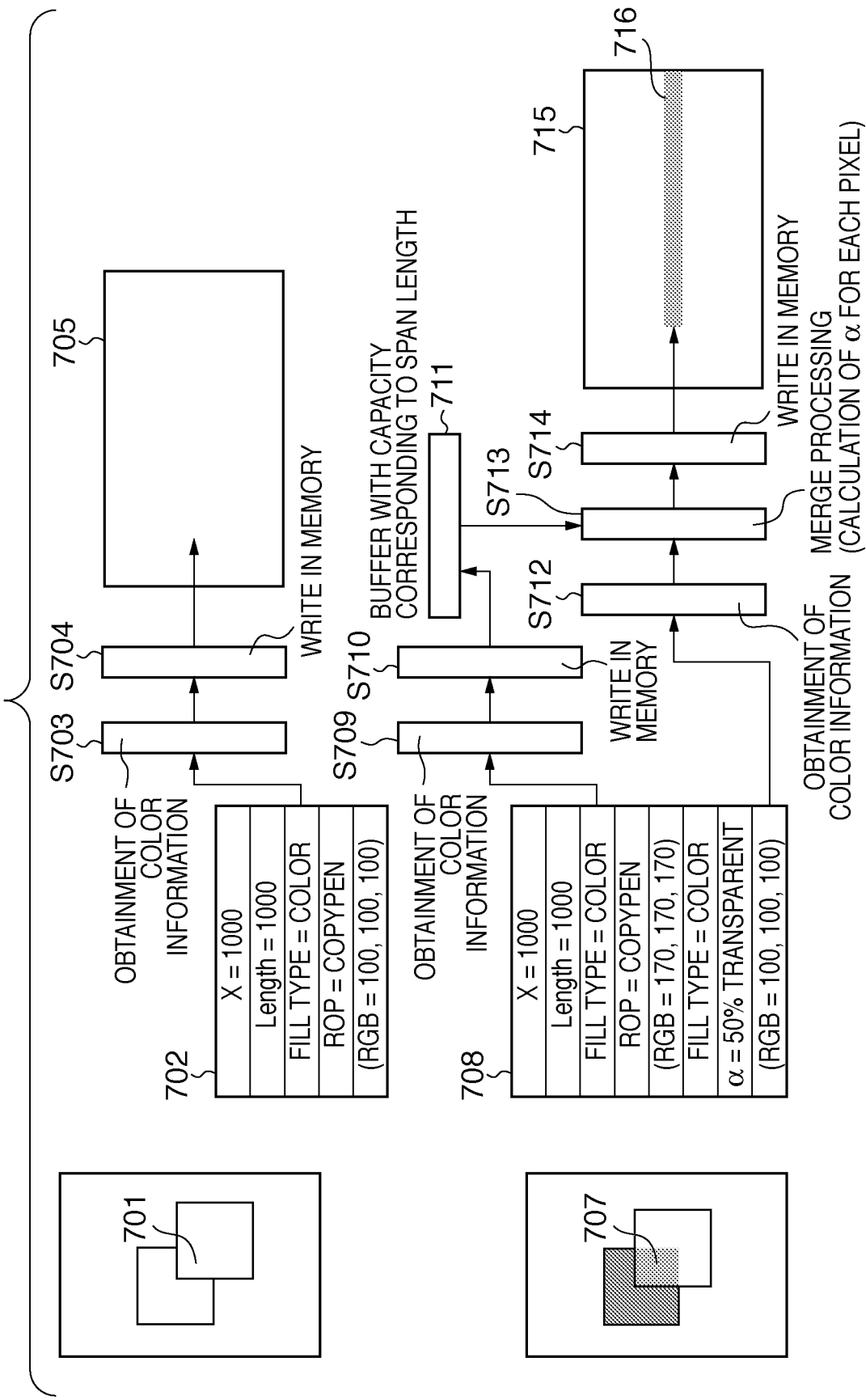
FIG. 7 is a view for explaining span fill-in processing.

Processing executed by the span fill-in unit 119 under the control of processor C will be described with reference to FIG. 7. In an image formation result 701, all objects are overwritten (COPYPEN: a background object is completely hidden behind a foreground one). The span fill-in unit 119 obtains a rendering start position (rendering X-coordinate: X=1000) described in span data 702 and the span length (=1000), and specifies a position where the span of a page image 705 is to be rendered. Also, the span fill-in unit 119 obtains color information at the specified span position based on fill information contained in the span data 702 (S703), writes it in the memory (S704), and fills in the span.

In a rendering formation result 707, all objects are not overwritten, and rendering (calculation of α) of an overlap with the background is required. In this case, the span fill-in unit 119 obtains a background color from span data 708 (S709), and temporarily writes it in a buffer 711 having a capacity corresponding to the span length (S710).

After that, the span fill-in unit 119 obtains, from fill information of the foreground, the color and the ratio (α information) at which the foreground is made transparent (S712). The span fill-in unit 119 reads out the background from the buffer 711, and calculates α of the foreground for each pixel (S713). The span fill-in unit 119 writes the result at a predetermined span position 716 of a page image 715 (S714).

When overwrite is designated for all objects in a page, the processing load on processor C is light. However, the background color of an object needs to be grasped, and the processing load rises when many objects overlap each other. For form data with many simple black characters contained in a page, a very long time is taken to extract an edge list from a binary bitmap and create span data by processor B. In contrast, processor C performs relatively simple processing of filling in the inside of the outline of a graphics in a binary bitmap in black. For this reason, the processing load is much heavier on processor B than on processor C. The multi-CPU configuration cannot be fully exploited, decreasing the speed of the rendering unit.

Processing after the edge list element count threshold determination unit 113 designates suppression of generating edge list elements will be explained. This processing can cancel the above-mentioned localization of the processing load and increase the speed of rendering processing by making full use of the multi-CPU configuration.

Figure 8:
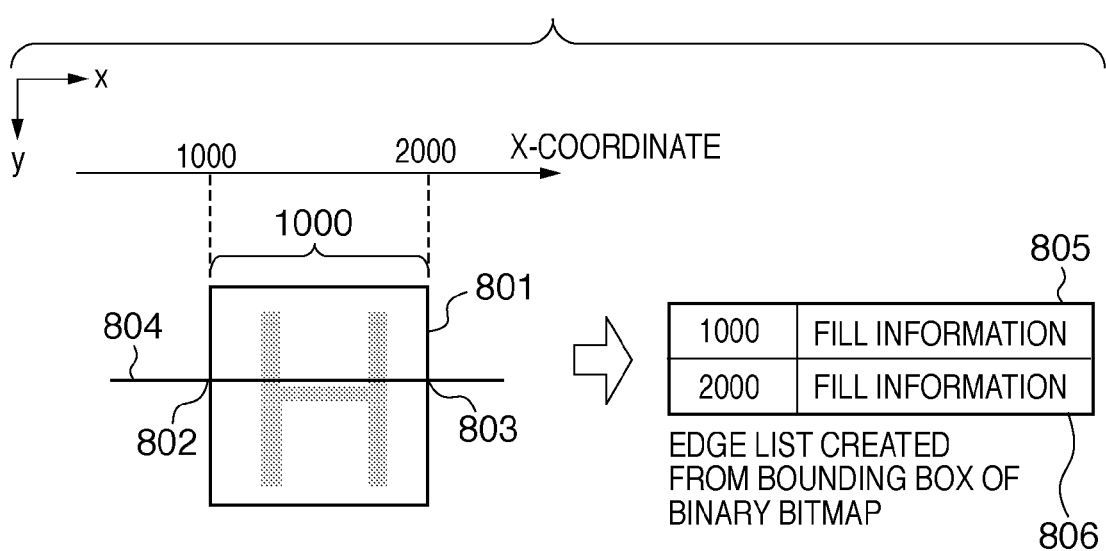
FIG. 8 is a view for explaining processing of extracting an edge position from edge information of a binary bitmap.

Processing of extracting an edge position from edge information of a binary bitmap after the edge list element count threshold determination unit 113 instructs the edge position extraction unit 112 to suppress generation (increase) of edge list elements will be explained with reference to FIG. 8. The edge position extraction unit 112 executes the following processing to reduce edge list elements. The edge position extraction unit 112 sets a rectangular region (to be referred to as a "bounding box") which surrounds a binary bitmap object, instead of extracting, as an edge position, the intersection position of the outline of a graphics in the binary bitmap and a line. As edge positions, the edge position extraction unit 112 extracts intersection positions 802 and 803 of a bounding box 801 of the binary bitmap and a line 804. As a result, the edge position extraction unit 112 extracts edge list elements 805 and 806.

The effect of extracting the intersection positions of the bounding box of a binary bitmap and a line as edge positions will be explained with reference to FIG. 9. Creation of an edge list by the edge position extraction unit 112 for one line 902 in an image formation result 901 will be described.

Edge position information 903 is created by extracting the intersection positions of the outline of the graphics in the binary bitmap and the line 902 as edge positions by the edge position extraction unit 112. In this case, four edge list elements need to be generated. To the contrary, edge position information 904 is created by extracting the intersection positions of the bounding box of the binary bitmap and the line 902 as edge positions by the edge position extraction unit 112. In this case, two edge list elements need to be generated.

Even for a graphics having a simple shape in the binary bitmap of "H", the data amount of the edge position information 903 is double that of the edge position information 904. For example, for a kanji character "難", the edge position extraction unit 112 needs to generate a maximum of 12 edge list elements when extracting the intersection positions of the outline of the graphics in the binary bitmap and a line as edge positions. In contrast, when the edge position extraction unit 112 extracts the intersection positions of the bounding box of the binary bitmap and the line 902 as edge positions, it always generates only two, right and left edge list elements. In this manner, the data amount of edge positions to be extracted can be reduced when the intersection positions of the bounding box of a binary bitmap and the line 902 are extracted as edge positions.

Figure 10:
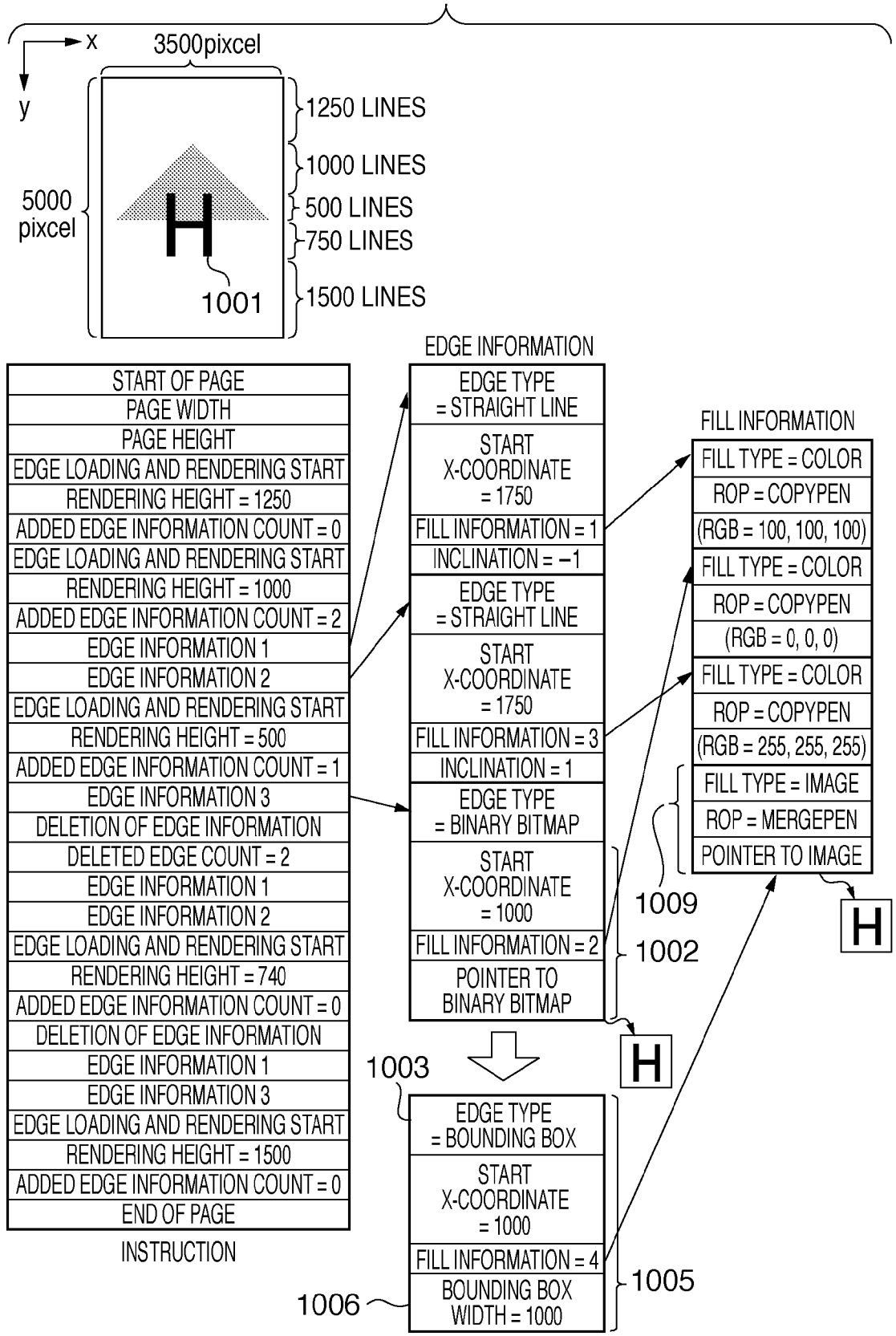
FIG. 10 is a view for explaining display list rewrite processing.

Processing of rewriting the edge information 107 and fill information 108 when the edge position extraction unit 112 extracts the intersection positions of the bounding box of a binary bitmap and a line as edge positions will be explained with reference to FIG. 10.

When the edge position extraction unit 112 extracts the intersection positions of the bounding box of a binary bitmap and a line as edge positions, the span fill-in unit 119 needs to fill in the section between two edges in the binary bitmap. For this purpose, rewrite processing is executed. Edge information 1002 designates extracting, as edge positions, the intersection positions of the outline of the graphics in the binary bitmap of a character "H" 1001 and a line. The edge position extraction unit 112 rewrites the edge information 1002 into edge information 1005 which designates extracting the intersection positions of the bounding box of the binary bitmap and the line as edge positions.

The edge position extraction unit 112 sets an edge type 1003=bounding box in the edge information 1005. The edge position extraction unit 112 rewrites a part of the edge information 1002 that describes a pointer to the binary bitmap, into a bounding box width 1006 of the binary bitmap.

Based on a start X-coordinate 1004 and the bounding box width 1006, the edge position extraction unit 112 can easily obtain the intersection positions of the bounding box and the line. The edge position extraction unit 112 defines, as the start X-coordinate 1004, an edge position where the left end of the bounding box and the line cross each other. The edge position extraction unit 112 adds the bounding box width 1006 to the start X-coordinate 1004, and sets the resultant coordinate as an edge position where the right end of the bounding box and the line cross each other. The edge position extraction unit 112 newly creates fill information 1009 indicating the fill type=image. The edge position extraction unit 112 adds, to the edge information 1005, data (fill information=4) which holds relevance between the fill information 1009 and fill information contained in the edge information 1005.

Figure 11:
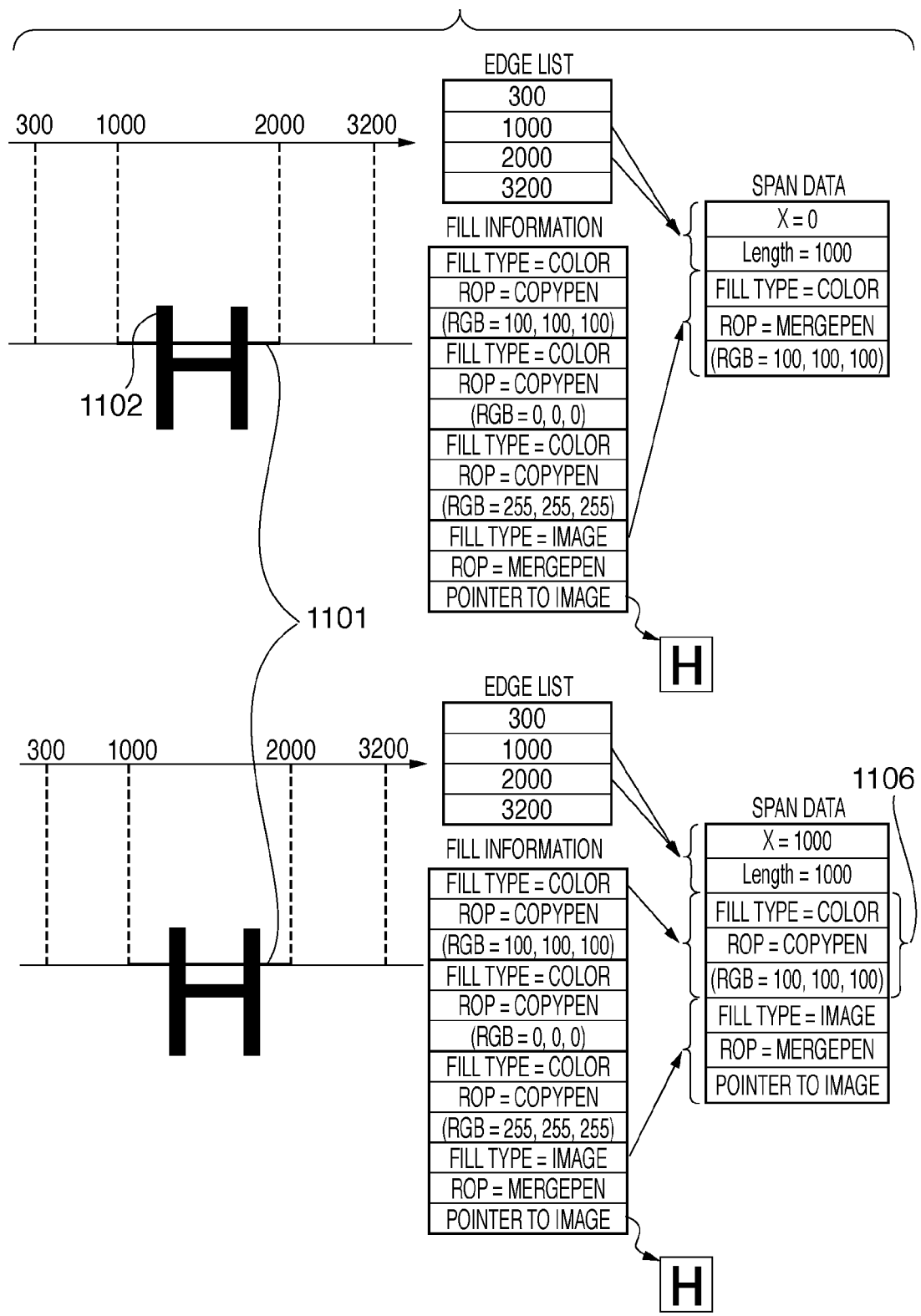
FIG. 11 is a view for explaining a change of span data generation processing.

A change of span data generation processing by the span extraction unit 117 when the intersection positions of the bounding box of a binary bitmap and a line are extracted as edge positions will be described with reference to FIG. 11.

If the span extraction unit 117 sends, to the span fill-in unit 119, span data of a span 1101 containing only the fill information 108 of the character "H", the span fill-in unit 119 fills in only the character "H", and the image of the background triangle is not formed as represented by 1102. To prevent this, the span extraction unit 117 determines whether the ROP of the fill information indicates information (ROP=COPYPEN) using a background object. When the ROP indicates information using a background object, the span extraction unit 117 sends, to the span fill-in unit 119, span data containing even fill information 1105 "gray (RGB=100, 100, 100)" of the triangle.

Figure 12:
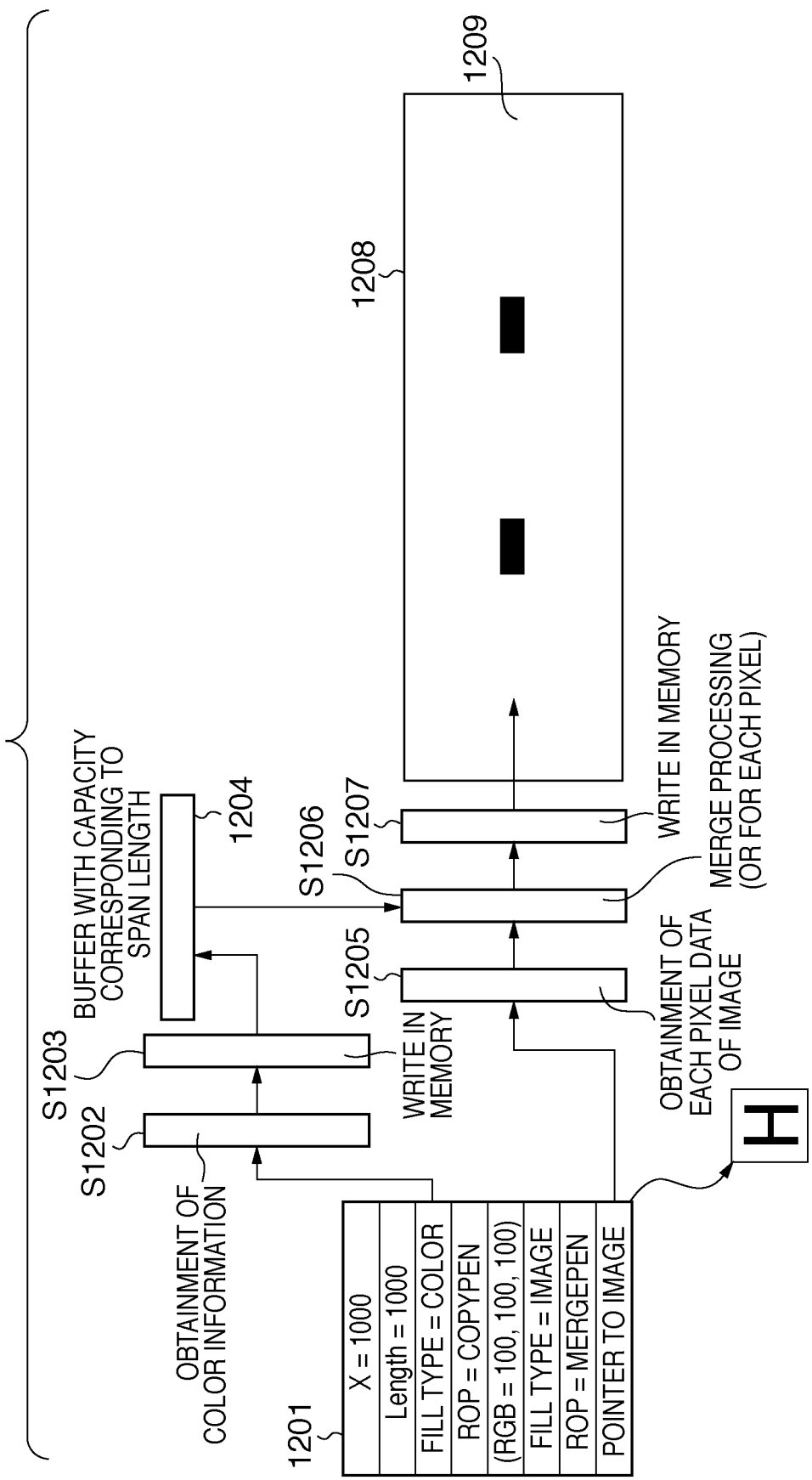
FIG. 12 is a view for explaining span fill-in processing.
Figure 13:
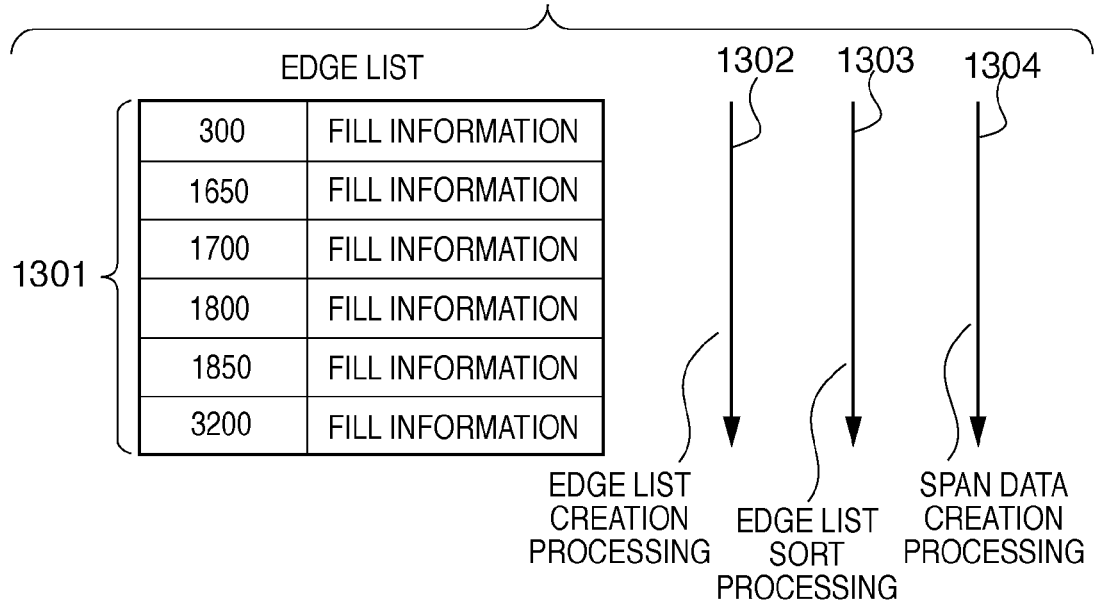
FIG. 13 is a view exemplifying access to the edge list.
Figure 14:
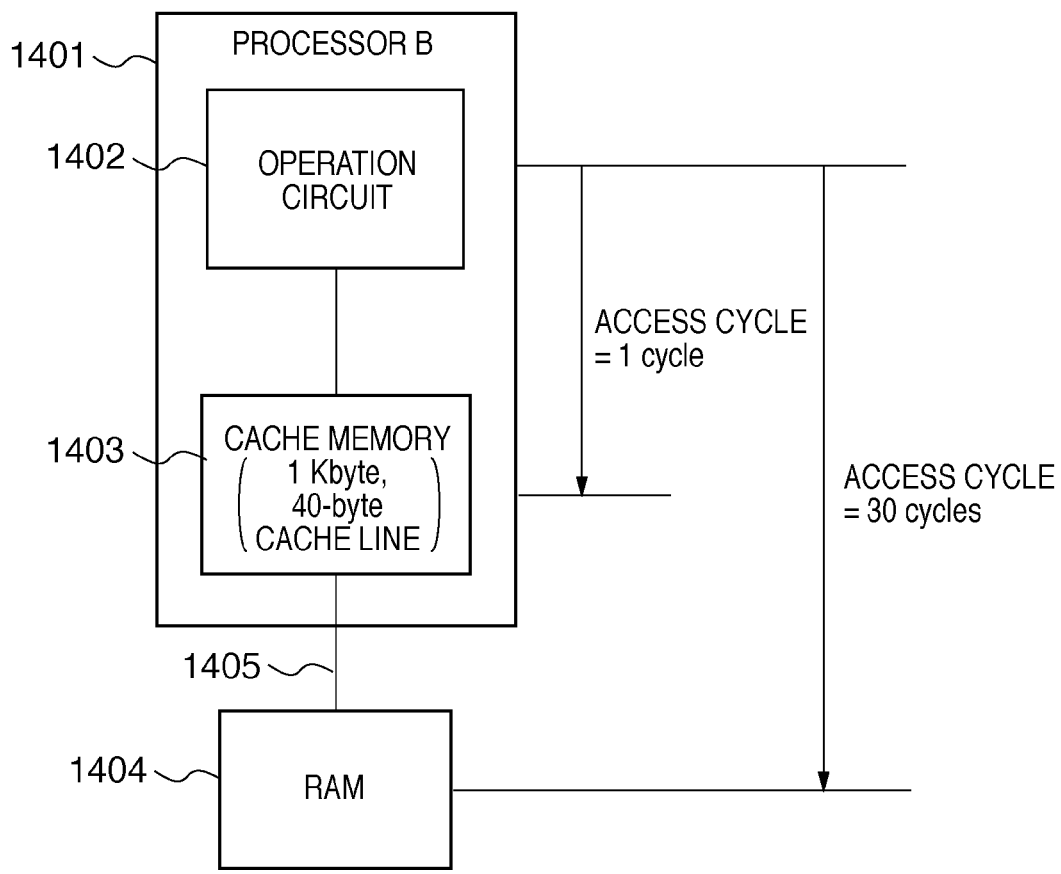
FIG. 14 is a block diagram exemplifying the arrangement of processor B and a RAM.
Figure 16A:
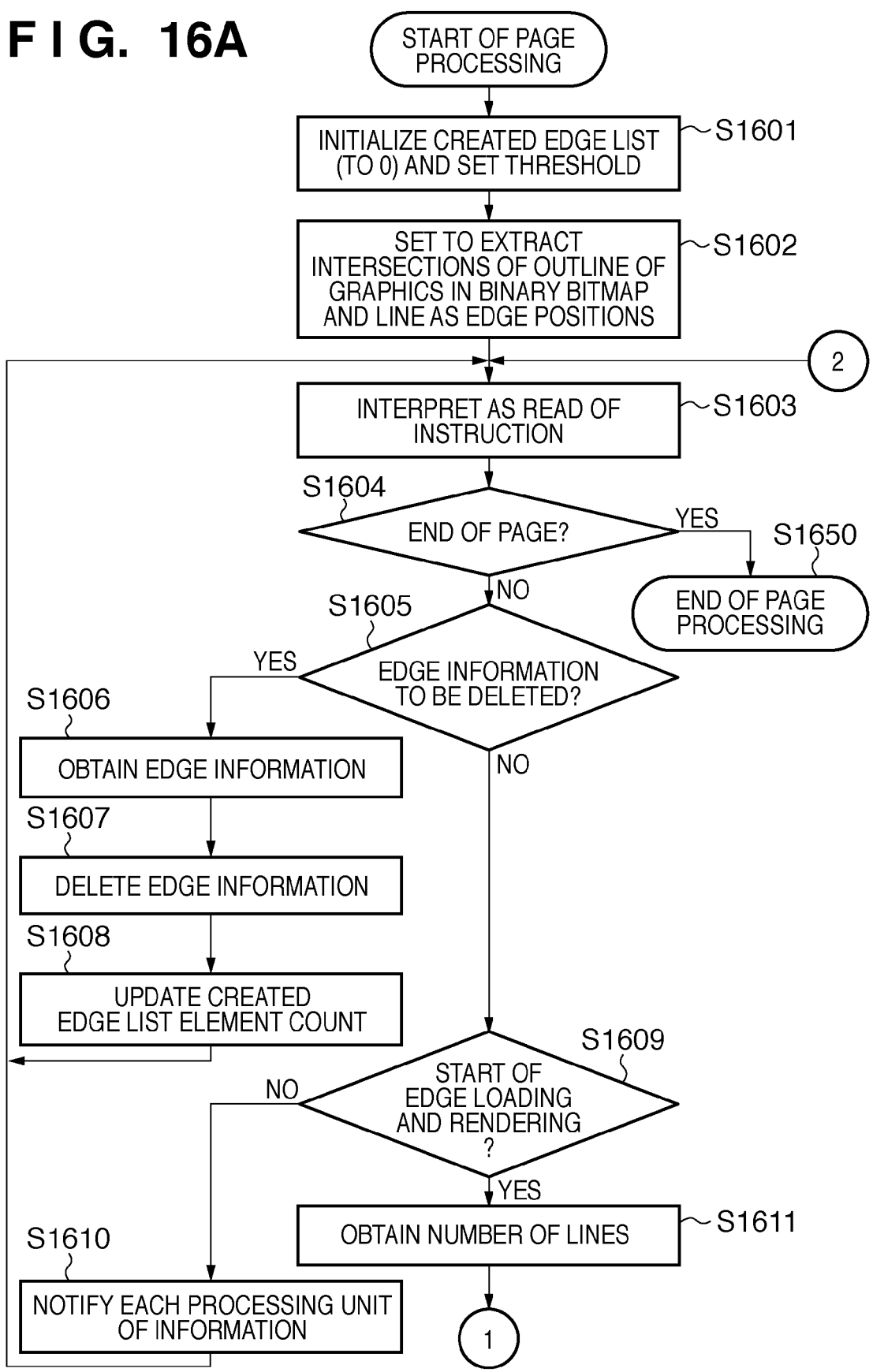
FIGS. 16A, 16B, 16C and 16D are flowcharts for explaining the sequence of processing by processor B.
Figure 16B:
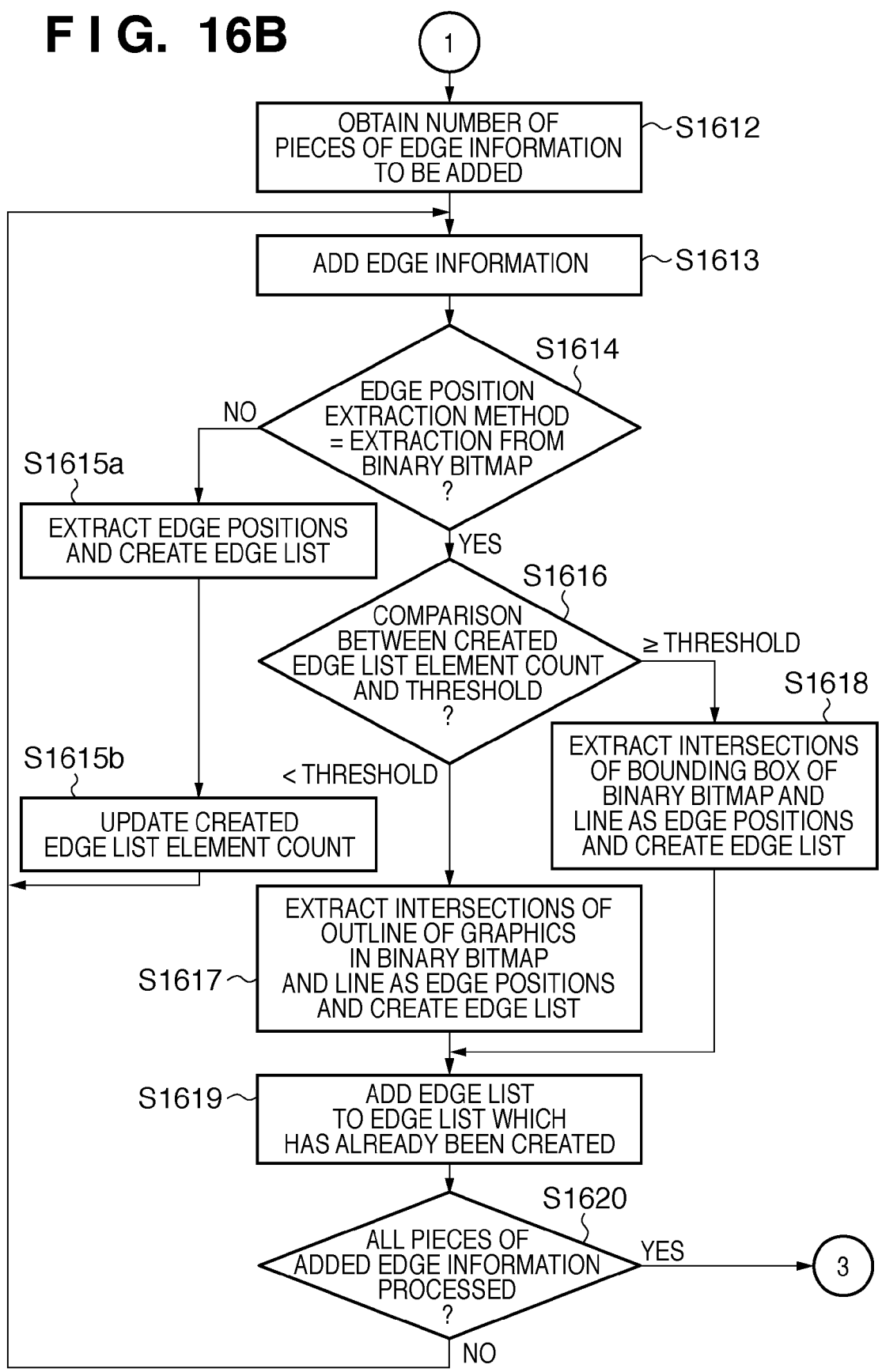
Figure 16C:
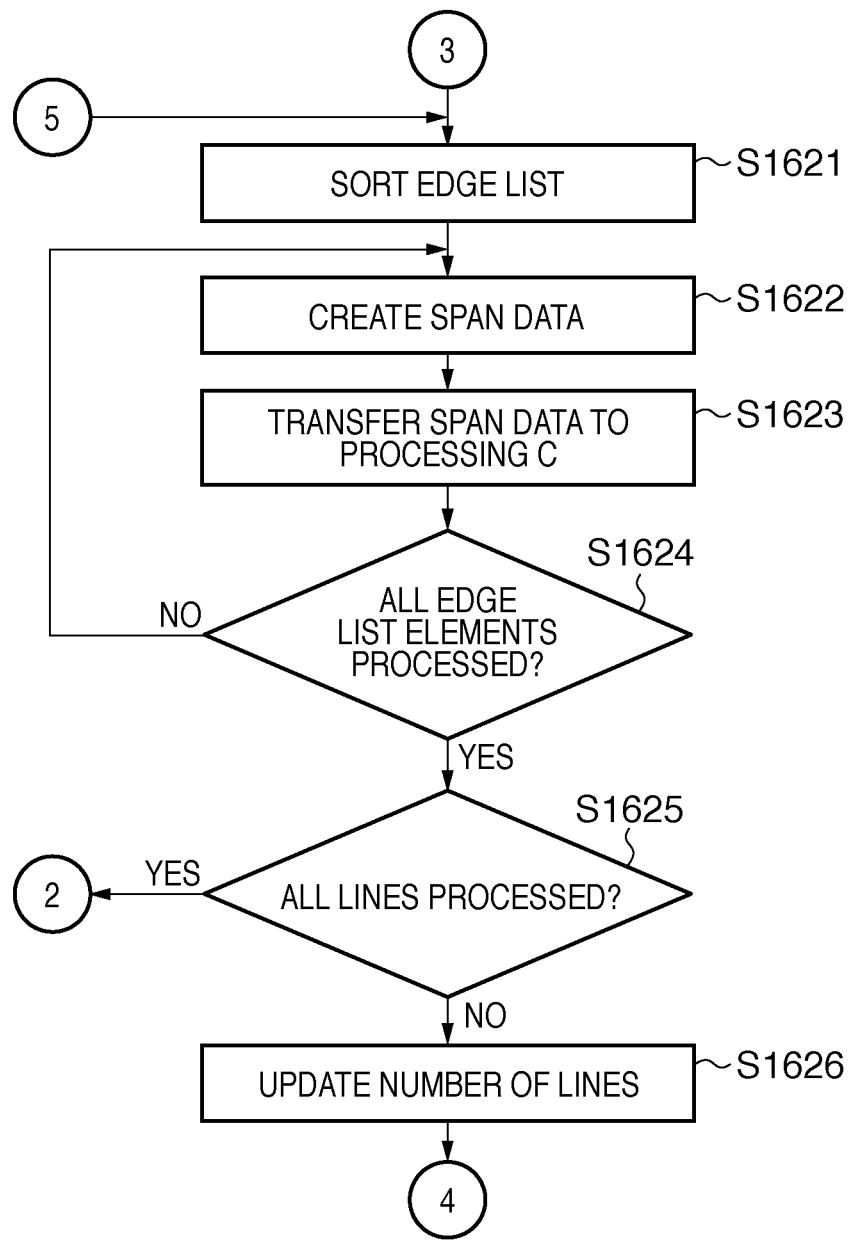
Figure 16D:
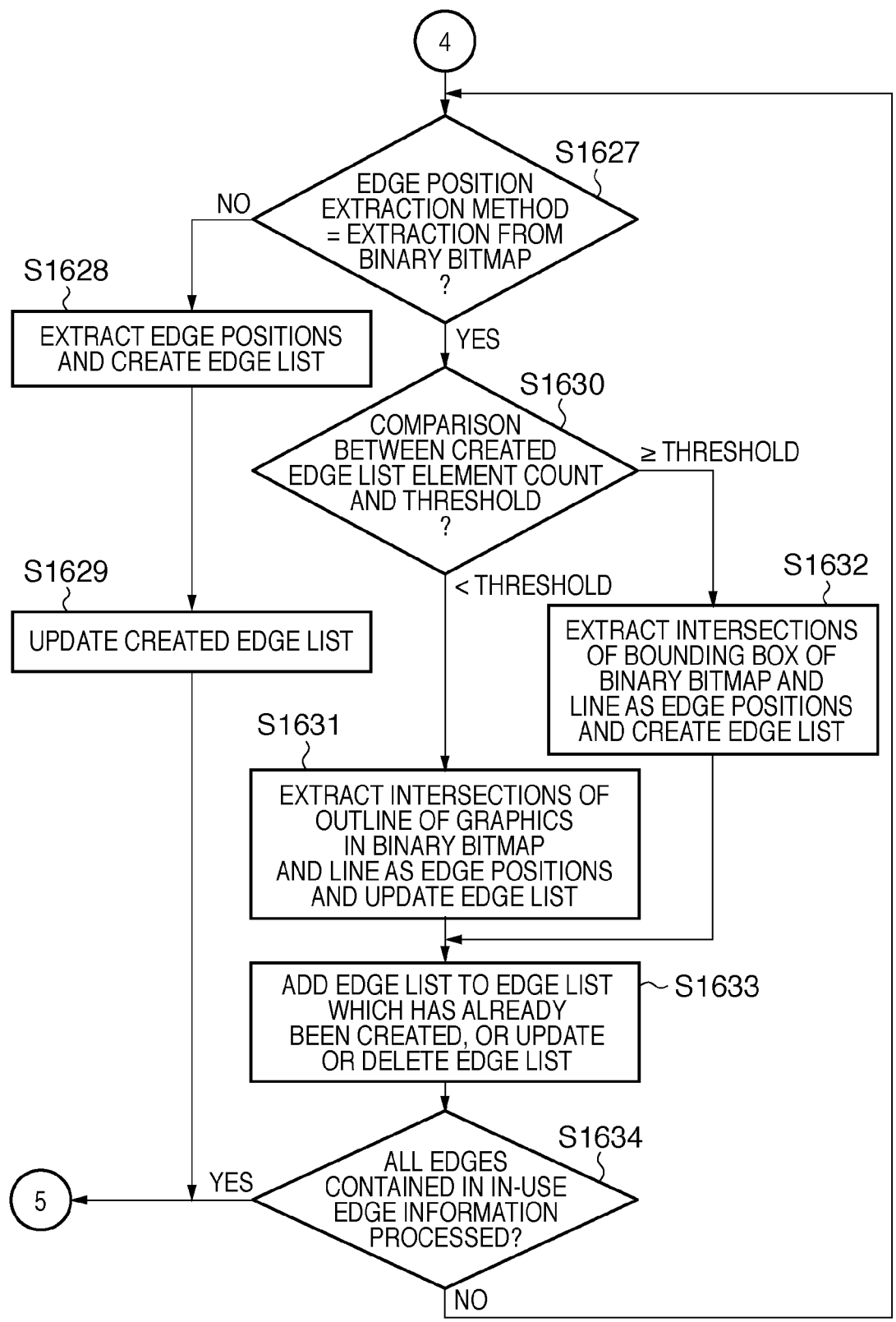

Fill-in processing between two edge positions that is executed by the span fill-in unit 119 when the intersection positions of the bounding box of a binary bitmap and a line are extracted as edge positions will be explained with reference to FIG. 12. As described with reference to FIG. 11, data generated by the span extraction unit 117 contains the fill information "gray (RGB=100, 100, 100)" and fill information of the binary bitmap of the foreground character "H".

The span fill-in unit 119 obtains the fill information "gray (RGB=100, 100, 100)" of the background (S1202). The span fill-in unit 119 rewrites all pixels in a buffer 1204 having a capacity corresponding to the span length into "gray (RGB=100, 100, 100)" (S1203).

The span fill-in unit 119 extracts one pixel from the binary bitmap of the character "H" (S1205), and also extracts one pixel from the buffer 1204 (S1206). The span fill-in unit 119 merges the two extracted pixels in accordance with merge information (in this case, OR operation, ROP=MERGEPEN) which is contained in span data 1201 and used to merge the foreground and background (S1206). The span fill-in unit 119 writes the merge result at a predetermined span position 1209 in a page image 1208 (S1207). The edge position extraction unit 112 extracts the intersection positions of the bounding box of the binary bitmap and a line as edge positions. This can reduce the edge list amount and the processing load on processor B. The embodiment can equalize processing loads, take advantage of the multi-CPU configuration, and increase the processing speed of the rendering unit 109.

An example of the edge list element count threshold held in the edge list element count threshold determination unit 113 will be explained with reference to FIG. 13 to FIGS. 15A to 15C. An edge list 1301 is accessed at least three times in edge list creation processing 1302, edge list sort processing 1303, and creation processing 1304 for creating span data from an edge list. These processes are executed under the control of processor B. When processor B and a RAM 1404 have an arrangement shown in FIG. 14, processor B obtains the edge list from a cache memory 1403 or the RAM 1404 and supplies it to an operation circuit 1402. Assume that an access from the operation circuit 1402 of processor B to the cache memory 1403 takes 1 cycle, and an access from the operation circuit 1402 to the RAM 1404 takes 30 cycles. In this arrangement, if the capacity of the whole edge list falls within the cache memory 1403, the operation circuit 1402 in processor B can quickly access the edge list 1301 (FIG. 13) and the processing can be done at high speed. Since the cache memory 1403 stores the entire edge list 1301, the operation circuit 1402 can quickly access the edge list 1301. Therefore, it suffices to obtain the edge list 1301 from the cache memory 1403 in the sort processing 1303 and span data creation processing 1304 after the creation processing 1302 in which the edge list 1301 has been created.

To the contrary, if the edge list 1301 has a capacity falling outside the cache memory 1403, the operation circuit 1402 in processor B accesses the RAM 1404 to obtain the edge list 1301, so no processing can be done at high speed.

An edge list 1501 in FIG. 15A stores 250 data and has a capacity of 1 kbyte. In contrast, an edge list 1502 in FIG. 15B stores 500 data and has a capacity of 2 kbytes. The edge list 1501 falls within the cache memory 1403, but the edge list 1502 does not fall within the cache memory 1403.

Assume that the cache line size of the cache memory 1403 is 40 bytes and the maximum data amount communicable by one access via a bus 1405 is 32 bits. Also assume that the operation circuit 1402 accesses the edge list 1301 for 4 bytes (32 bits) of each edge list element. When the cache line size is 40 bytes, 40 bytes are stored in the cache memory 1403 from the RAM 1404 by an access (4 bytes) from the operation circuit 1402 to the first edge list element. After that, the operation circuit 1402 can access nine (36 bytes) edge list elements in the cache memory 1403. When the cache memory 1403 does not store the edge list, the operation circuit 1402 accesses the edge list 1501 (size of 1 kbyte for 250 data) in the RAM 1404 in 975 cycles (25×30+225×1=975).

When the cache memory 1403 stores all edge list data, the operation circuit 1402 accesses the edge list 1501 (edge list size of 1 kbyte for 250 data) in the cache memory 1403 in 250 cycles. In edge list data sorting and span data creation, the operation circuit 1402 accesses the edge list 1501 in the cache memory 1403 in 250 cycles. That is, accesses in 1,475 cycles (975+250+250=1475 cycles) are necessary to obtain 250 data of the edge list 1501 by processor B.

When the cache memory 1403 does not store the edge list, the operation circuit 1402 accesses the edge list 1502 (size of 2 kbyte for 500 data) in the RAM 1404 in 1,950 cycles (50×30+450×1=1950). Since the edge list 1502 does not fall within the cache memory 1403, accesses in 5,850 cycles (1950+1950+1950=5850) are necessary to obtain 500 data of the edge list 1502 by processor B. The data amount of the edge list 1502 is twice that of the edge list 1501. However, a comparison of the number of access cycles necessary to obtain data reveals that the time taken to obtain data of the edge list 1502 by processor B is about four times longer than that taken to obtain data of the edge list 1501.

In this way, if the data amount stored in the edge list increases and the edge list cannot fall within the cache memory 1403 of processor B, the processing speed of processor B is predicted to further decrease. To prevent this, the edge list element count threshold determination unit 113 can set, as a threshold, for example, a data amount obtained when an edge list corresponding to half the capacity of the cache memory is created, so that the edge list falls within the cache memory 1403. The number (data amount) of pieces of edge information to be added later can be attained by analyzing the instruction 106 containing control information of an entire page. By comparing the free area of the cache memory 1403 with the number of pieces of edge information to be added later, the edge list element count threshold determination unit 113 can also arbitrarily set a threshold for controlling the total number of edge list elements. Assume that 100 pieces of edge information are added and 70 edge list elements have been created at present, as represented by a table 1503 in FIG. 15C, and the number of edge list elements is 190, as represented by a table 1504. When the number of edge list elements storable in the cache memory 1403 is 250, the number of edge list elements to be created should be 60 or less. At least two edge list elements are created for one edge information.

For example, according to a method of creating the intersections of the outline of a graphics in a binary bitmap and a line as edge list elements, two or more edge list elements may be created from one edge information. According to a method of creating the intersections of the bounding box of a binary bitmap and a line as edge list elements, the number of created edge list elements is always two. Hence, when the number of remaining pieces of edge information is 30, the number of edge list elements to be created becomes 60 or less as long as two edge list elements are created from one of the remaining pieces of edge information. Thus, when the number of created edge list elements reaches 70, the method of creating the intersections of the outline of the graphics in the binary bitmap and the line as edge list elements is switched to the method of creating the intersections of the bounding box of the binary bitmap and the line as edge list elements.

The sequence of 1-page rendering processing executed by processor B will be explained with reference to the flowcharts of FIGS. 16A, 16B, 16C and 16D. Processor B reads out a program stored in any storage unit among the ROM, RAM, and HDD to execute the processing in FIGS. 16A, 16B, 16C and 16D. At the start of page processing, the edge list element count threshold determination unit 113 initializes the created edge list element count (to 0), and sets a threshold for switching the method of extracting an edge from a binary bitmap (S1601). In the processing of these flowcharts, the threshold is a fixed value, and is set to an initial value held in the ROM or a value written in a predetermined RAM area by manipulating the user interface of the image forming apparatus by the user.

The edge position extraction unit 112 sets "to extract the intersections of a graphics in a binary bitmap and a line as edge positions" as the edge position extraction method when a binary bitmap is designated as edge information (S1602). The display list interpretation unit 111 reads the display list 105, and interprets control information which is contained in the instruction 106 of the display list 105 and used to control image formation of each page that forms an electronic document (S1603). If the display list means the end of the page as a result of interpreting the instruction 106 by the display list interpretation unit 111 (YES in S1604), the process advances to step S1650. Then, the display list interpretation unit 111 ends rendering of one page (S1650).

If it is determined in S1604 that the display list does not mean the end of the page as a result of interpreting the instruction 106 by the display list interpretation unit 111 (NO in S1604), the process advances to step S1605. If the display list means deletion of edge information as a result of interpreting the display list 105 by the display list interpretation unit 111 (YES in S1605), the process advances to step S1606.

The display list interpretation unit 111 instructs the edge position extraction unit 112 to execute edge information deletion processing. In response to this instruction, the edge position extraction unit 112 obtains edge information to be deleted from the instruction 106 contained in the display list 105 (S1606). Then, the edge position extraction unit 112 deletes the edge information from the in-use edge information 124 and edge list 115 (S1607). The edge position extraction unit 112 notifies the edge list element count threshold determination unit 113 of the deleted edge list element count. The edge list element count threshold determination unit 113 updates the created edge list element count (S1608). The process returns to step S1603 to repeat the same processes.

If it is determined in step S1605 that the display list does not mean deletion of edge information as a result of interpretation by the display list interpretation unit 111 (NO in S1605), the process advances to step S1609. If the display list 105 does not designate the start of edge loading and rendering as a result of interpreting the display list 105 by the display list interpretation unit 111 (NO in S1609), the display list interpretation unit 111 notifies each processing unit of information regarding the settings of the page height and page width (S1610).

If the display list 105 designates the start of edge loading and rendering as a result of interpreting the display list 105 by the display list interpretation unit 111 (YES in S1609), the process advances to step S1611. The display list interpretation unit 111 instructs the edge position extraction unit 112 to add edge information and start executing image formation. In response to this instruction, the edge position extraction unit 112 obtains the number of lines to undergo image formation (S1611). The edge position extraction unit 112 obtains the number of pieces of edge information to be added from the instruction 106 contained in the display list 105 (S1612). The edge position extraction unit 112 obtains edge information to be added from the instruction 106 contained in the display list 105, and adds it to the in-use edge information 124 (S1613).

By referring to the edge information added to the in-use edge information 124, the edge position extraction unit 112 determines edge positions to be extracted from the binary bitmap (S1614). If the edge position extraction method is not extraction from the binary bitmap (NO in S1614), the edge position extraction unit 112 extracts edge positions according to the designated method, creating an edge list (S1615a). The edge position extraction unit 112 notifies the edge list element count threshold determination unit 113 of the number of edges created in step S1615a. The edge list element count threshold determination unit 113 updates the created edge list element count (S1615b). The process returns to step S1613 to repeat the same processes.

If it is determined in step S1614 that the edge position extraction method is extraction from the binary bitmap (YES in S1614), the process advances to step S1616. The edge position extraction unit 112 inquires of the edge list element count threshold determination unit 113 which of the methods in steps S1617 and S1618 is used for extraction from the binary bitmap.

In step S1616, the edge list element count threshold determination unit 113 compares the created edge list element count with the threshold. If the created edge list element count is smaller than the threshold, the process advances to step S1617. The edge list element count threshold determination unit 113 instructs the edge position extraction unit 112 to extract the intersections of the graphics in the binary bitmap and the line as edge positions. In response to this instruction, the edge position extraction unit 112 extracts the intersections of the graphics in the binary bitmap and the line as edge positions, creating an edge list (S1617).

If it is determined in S1616 that the created edge list element count is greater than or equal to the threshold, the edge list element count threshold determination unit 113 instructs the edge position extraction unit 112 to extract the intersections of the bounding box of the binary bitmap and the line as edge positions. According to this instruction, the edge position extraction unit 112 extracts the intersections of the bounding box of the binary bitmap and the line as edge positions, creating an edge list (S1618).

The edge list created by the edge position extraction unit 112 in step S1617 or S1618 is added to the edge list which has already been created (S1619). In step S1620, the edge position extraction unit 112 determines whether all pieces of edge information added based on an instruction in the instruction 106 of the display list 105 have been processed. If the edge position extraction unit 112 determines that edge information addition processing has not ended, the process returns to step S1613 to repeat the same processes. If the edge position extraction unit 112 determines that edge information addition processing has ended, the process advances to step S1621.

In step S1621, the edge position extraction unit 112 instructs the edge position sorting unit 116 to sort the edge list. By referring to the edge list, the edge position sorting unit 116 executes sorting (S1621). After the end of sorting, the edge position sorting unit 116 instructs the span extraction unit 117 to generate span data. The span extraction unit 117 generates span data (S1622), and transfers it to processor C (S1623).

After all edge list elements have been processed (YES in S1624), the span extraction unit 117 notifies the edge position extraction unit 112 of the end of the processing. If the span extraction unit 117 determines in step S1624 that not all edge list elements have been processed, the process advances to step S1626. At the end of processing one line, the edge position extraction unit 112 updates the number of lines obtained in step S1611 (S1626).

The edge position extraction unit 112 refers to all pieces of edge information in the in-use edge information 124. If an extracted edge has not been extracted from the binary bitmap (NO in S1627), the edge position extraction unit 112 extracts edge positions according to the designated method, creating an edge list (S1628). The edge position extraction unit 112 notifies the edge list element count threshold determination unit 113 of the number of edges created in step S1628. The edge list element count threshold determination unit 113 updates the created edge list element count (S1629). The process then returns to step S1621 to repeat the same processes.

If it is determined in step S1627 that the edge extraction method is extraction from the binary bitmap (YES in S1627), the process advances to step S1630. The edge position extraction unit 112 inquires of the edge list element count threshold determination unit 113 which of the methods in steps S1631 and S1632 is used for extraction from the binary bitmap.

In step S1630, the edge list element count threshold determination unit 113 compares the created edge list element count with the threshold. If the created edge list element count is smaller than the threshold, the process advances to step S1631. The edge list element count threshold determination unit 113 instructs the edge position extraction unit 112 to extract the intersections of the graphics in the binary bitmap and the line as edge positions. In response to this instruction, the edge position extraction unit 112 extracts the intersections of the graphics in the binary bitmap and the line as edge positions, creating an edge list (S1631).

If it is determined in S1630 that the created edge list element count is greater than or equal to the threshold, the edge list element count threshold determination unit 113 instructs the edge position extraction unit 112 to extract the intersections of the bounding box of the binary bitmap and the line as edge positions. According to this instruction, the edge position extraction unit 112 extracts the intersections of the bounding box of the binary bitmap and the line as edge positions, updating the edge list (S1632).

The edge list created in step S1631 or updated in step S1632 by the edge position extraction unit 112 is added to the edge list which has already been created, updated, or deleted (S1633). This edge list is added, updated, or deleted because an outline newly appears or disappears in the binary bitmap when the intersections of the outline of the graphics in the binary bitmap and the line are extracted as edge positions.

In step S1634, the edge position extraction unit 112 determines whether addition, update, or deletion has ended for all edge list elements of edge information contained in the in-use edge information 124. If the processing has ended (YES in S1634), the process returns to step S1621 to sort the edge list. If the edge position extraction unit 112 determines in step S1634 that the processing has not ended (NO in step S1634), the process returns to step S1627 to repeat the processes in S1627 and subsequent steps.

An example of a system configuration using configurable processors will be described with reference to FIG. 17. A physical interface 1704, RAMs 1705 and 1706, a ROM 1707, an HDD 1708, an engine 1709, and three CPUs 1701 to 1703 are connected to a bus 1710. The general-purpose CPU 1701 processes an external interface, electronic document, and PDL data. The electronic document and PDL data contain various kinds of data, and thus require a CUP which has a large cache memory capacity and high operation clock and can execute a variety of processes quickly though the cost is high. The CPU 1702 formed as a configurable processor corresponds to processor B in FIG. 1. Processor B suffices to perform only edge list processing, its operation is mainly memory access, and the internal arithmetic performance of the processor suffices to be low. Hence, the operation clock can be low and no specific operation circuit need be mounted. As described above, processor B frequently accesses the same memory, so a cache memory with a relatively large capacity is arranged to increase the speed while suppressing the cost.

Figure 2:
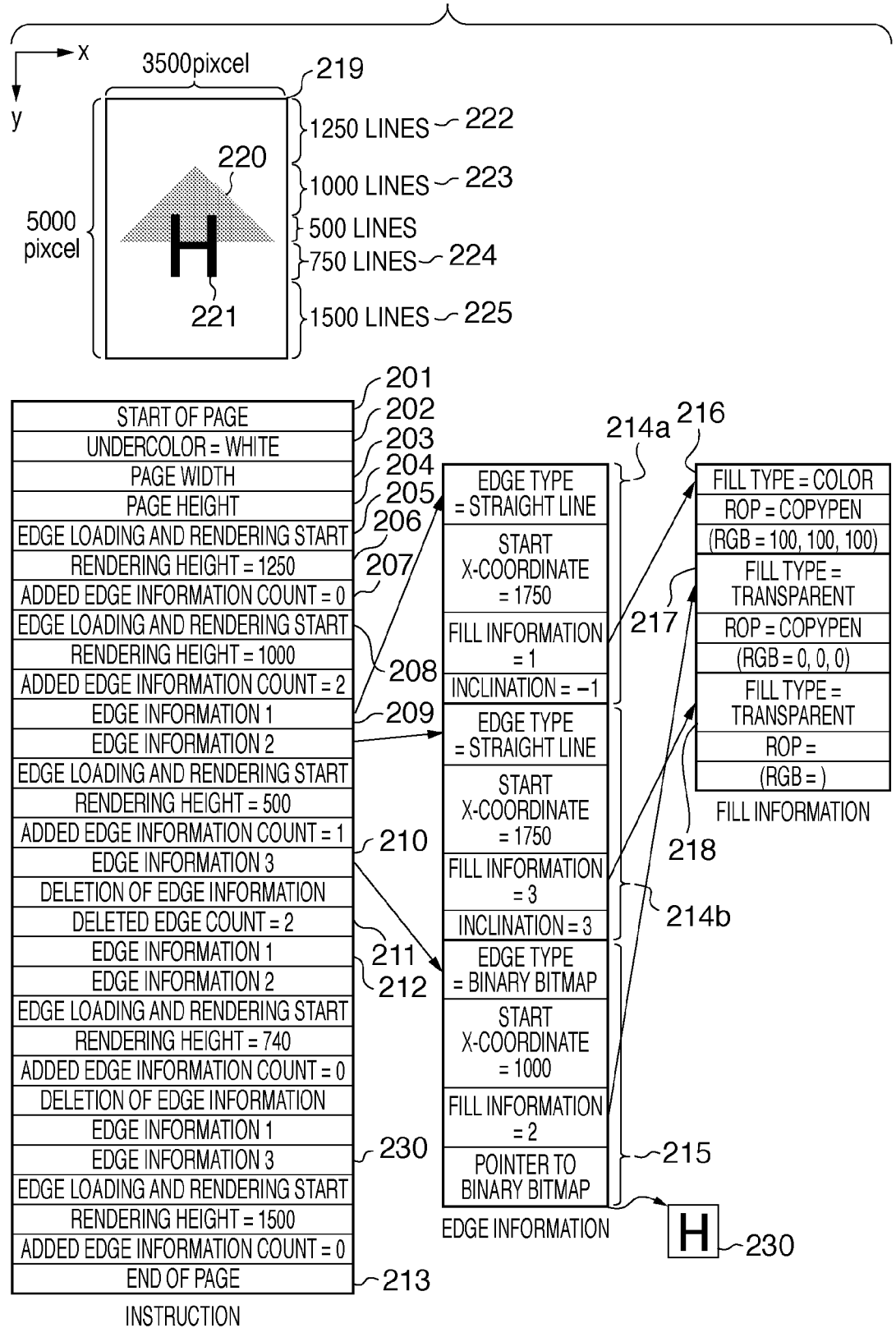
FIG. 2 is a view for explaining an example of the structure of a display list.

The CPU 1703 formed as a configurable processor corresponds to processor C in FIG. 1. Processor C fills in spans in order and rarely accesses the same memory. Therefore, the effectiveness of the cache memory is low, and the cache memory suffices to have a small capacity. Processor C internally executes many processes such as ROP and calculation of α. Thus, operation circuits for performing ROP and calculation of α are mounted in the configurable processor, thereby increasing the speed while suppressing the cost.

The configurable processors 1702 and 1703 are manufactured to be specialized in specific processes. For this reason, no speed can be increased by load distribution of performing edge list processing by the configurable processor 1703 and rendering a background object by the configurable processor 1702. In the embodiment, only the processing load can be changed without changing processes to be executed by the configurable processors 1702 and 1703, which is suitable for a system formed from configurable processors. The first embodiment can provide an image forming technique capable of quickly performing rendering processing for an electronic document or PDL data containing many character objects and graphics objects.

(Second Embodiment)

In the first embodiment, the method of extracting an edge position from a binary bitmap is switched based on the threshold set by the edge list element count threshold determination unit 113 in the rendering unit 109. However, switching of the edge position extraction method is not limited to this example, and, for example, an electronic document & PDL data generation unit may determine switching when creating a display list.

Figure 18:
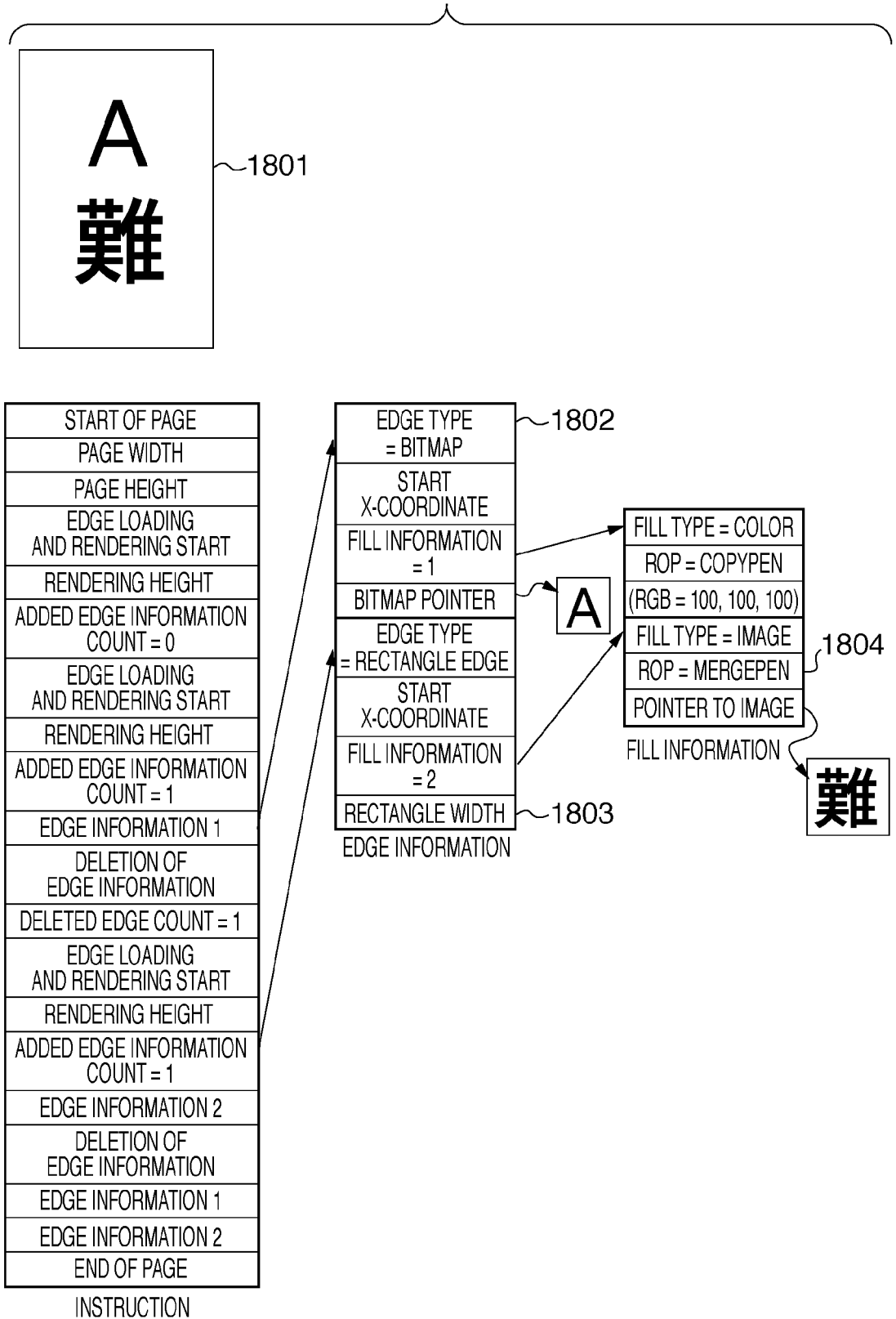
FIG. 18 is a view exemplifying the structure of a display list.

Assume that the image forming apparatus processes an electronic document or PDL data having a page 1801 containing characters "A" and "難", as shown in FIG. 18. To reduce the edge list creation amount in a rendering unit 109, it suffices to extract edge positions from "A" whose outline is simple, without extracting edge positions from "難" whose outline is complicated. When a data generation unit 104 capable of processing an electronic document and PDL data generates a display list, it creates "A" as edge information, as represented by 1802. The data generation unit 104 registers the outline of the binary bitmap of "難" as edge information, as represented by 1803, and creates fill information of the binary bitmap, as represented by 1804. The data generation unit 104 determines the complexity of the outline of each character by actually scanning the binary bitmap.

If the processing speed decreases when the data generation unit 104 actually scans the binary bitmap to determine complexity, the complexity is determined based on a 1- or 2-byte character as long as the character code is attached to an electronic document or PDL data. Alternatively, the ROM or HDD may hold in advance the database of, for example, the complexity (maximum extracted edge list element count) of an outline corresponding to each character code.

Processing by the rendering unit 109 and the effects of the second embodiment will be explained in detail with reference to FIGS. 19 to 21. Processors 1902 and 1904 in FIG. 19 correspond to processors B and C in FIG. 1. The processor 1902 reads a display list 1901, and extracts outline information 1903 (edge list and span data) of a graphics in a binary bitmap from edge data of the binary bitmap. The processor 1904 reads the outline information 1903 extracted by the processor 1902, fills in the inside of the outline, and generates an actual image 1905. When forming the image of form data 1906 containing many edge data of a binary bitmap, the processing load of the outline information 1903 on the processor 1902 is heavy and that on the processor 1904 is light, as represented by 1907.

Figure 19:
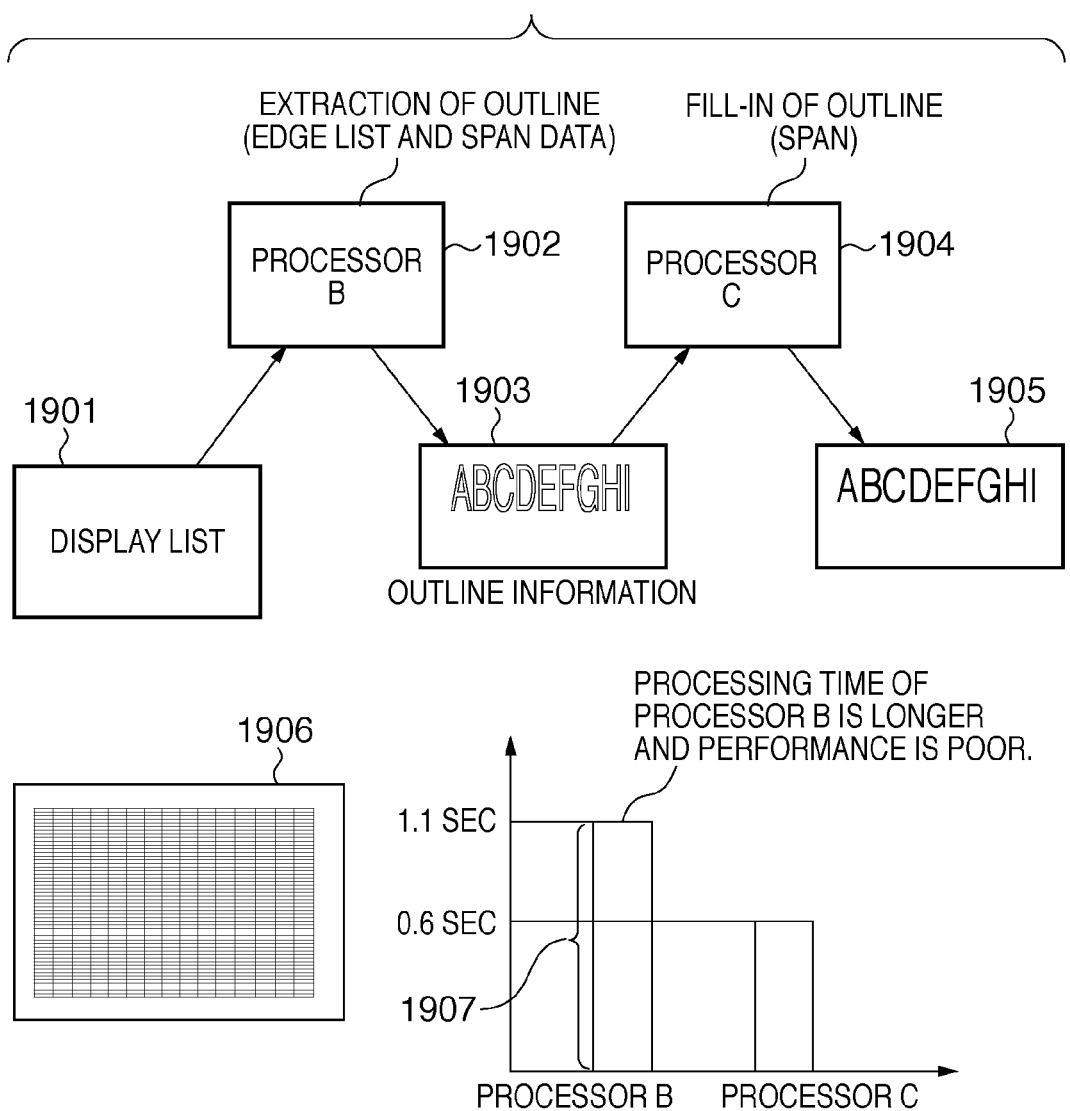
FIG. 19 is a view for explaining processing by a rendering unit.

In a processing example 2001 of FIG. 20, the processor 1902 in FIG. 19 extracts the outlines of internal graphics from all binary bitmaps as the outline information 1903. In 2002, the processor 1902 in FIG. 19 extracts the outlines of internal graphics from some binary bitmaps as the outline information 1903 (2005). For binary bitmaps in which the edge list element count exceeds the threshold, the processor 1902 extracts bounding boxes as the outline information 1903 (2006). This is an example of the second embodiment of the present invention.

Since the processor 1902 extracts outline information as represented by 2002, the processing time is shortened by 0.5 sec as represented by 2004, reducing the processing load on the processor 1902. When the processor 1902 extracts outline information as represented by 2002 and the processor 1904 does not merge the binary bitmap and a background image, the background image is lost and an image error occurs as represented by 2101 in FIG. 21. To prevent this, the processor 1904 merges the binary bitmap and background image to prevent the loss of the background image, as represented by 2102.

The processing load on the processor 1904 rises because the processor 1904 executes merge with the background, as represented by 2103. When the processors 1902 and 1904 perform pipeline operations, the processing time of slower processing determines that of the rendering unit 109. For example, when the processor 1902 extracts outline information, as represented by 2002, the processing time of the processor 1902 is 0.6 sec (FIG. 20). Processing of the form data 1906 (FIG. 19) containing many edge data of a binary bitmap will be examined. In this case, the processing load is localized to the processor 1902, and the processing time of the rendering unit 109 becomes 1.1 sec as represented by 2104 (FIG. 21), prolonging the processing time from 0.6 sec to 1.1 sec. When the embodiment of the present invention is applied to process the form data 1906 containing many edge data of a binary bitmap, the processing load on the processor 1902 decreases, shortening the processing time from 1.1 sec to 0.75 sec. To the contrary, the processing load on the processor 1904 increases, prolonging the processing time from 0.6 sec to 0.75 sec. The processing loads on the processors 1902 and 1904 are distributed, shortening the processing time of the rendering unit 109 from 1.1 sec to 0.75 sec, as represented by 2104.

The second embodiment can provide an image forming technique capable of quickly performing rendering processing for an electronic document or PDL data containing many character objects and graphics objects.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-133456, filed Jun. 2, 2009, which is hereby incorporated by reference herein in its entirety.

What is claimed is:

1. An image forming apparatus comprising:
a reception unit configured to receive an electronic document;
a generation unit configured to generate a display list containing edge information indicating an outline of an object contained in the electronic document received by said reception unit, fill information for determining a color to fill in an inside of the outline of the object, and control information for controlling image formation of each page that forms the electronic document; and
an intersection extraction unit configured to, in a case where a scan line rendering processing for an object in a page of the electronic document is performed for each scan line, extract intersections of the object and the scan line based on the edge information, as edges of the object on the scan line,
wherein in a case where a number of intersections of the object and the scan line extracted by said intersection extraction unit becomes not smaller than a threshold, said intersection extraction unit sets a rectangular region which surrounds the object, and extracts, as edges of the object on the scan line, intersections of the rectangular region and the scan line.

2. The apparatus according to claim 1, further comprising:
a span extraction unit configured to extract, as a span, a section between the edges extracted by said intersection extraction unit; and
a fill-in control unit configured to control, based on the fill information, fill-in of the span extracted by said span extraction unit.

3. The apparatus according to claim 1, further comprising: a setting unit configured to set, based on a data amount of the edges extracted by said intersection extraction unit and a data amount of edges in the page that is predicted by analyzing the control information, the threshold for controlling extraction of the edges by said intersection extraction unit to fall within a predetermined data amount,
wherein said setting unit controls setting of the threshold in accordance with a remaining capacity storable in a storage unit configured to store information of the edges extracted by said intersection extraction unit.

4. The apparatus according to claim 3, wherein in a case where the remaining capacity decreases upon storing, in the storage unit, the information of the edges extracted by said intersection extraction unit, said setting unit updates the setting of the threshold based on the decrease in the remaining capacity.

5. The apparatus according to claim 2, wherein said span extraction unit generates span data containing merge information which is obtained from the fill information and indicates merge of the object and a background to be merged, and the span between the edges.

6. The apparatus according to claim 5, wherein in a case where said intersection extraction unit sets the rectangular region which surrounds the object, and extracts, as edges of the object on the scan line, intersections of the rectangular region and the scan line, said fill-in control unit controls fill-in of the span based on the merge information contained in the span data for the span extracted by said span extraction unit.

7. An image forming apparatus control method comprising:
a reception step of receiving an electronic document;
a generation step of generating a display list containing edge information indicating an outline of an object contained in the electronic document received in the reception step, fill information for determining a color to fill in an inside of the outline of the object, and control information for controlling image formation of each page that forms the electronic document; and
an intersection extraction step of, in a case where a scan line rendering processing for an object in a page of the electronic document is performed for each scan line, extracting intersections of the object and the scan line based on the edge information, as edges of the object on the scan line,
wherein in the intersection extraction step, in a case where a number of intersections of the object and the scan line extracted in the intersection extraction step becomes not smaller than a threshold, a rectangular region which surrounds the object is set, and as edges of the object on the scan line, intersections of the rectangular region and the scan line are extracted.

8. The method according to claim 7, further comprising:
a span extraction step of extracting, as a span, a section between the edges extracted in the intersection extraction step; and
a fill-in control step of controlling, based on the fill information, fill-in of the span extracted in the span extraction step.

9. The method according to claim 8, further comprising: a setting step of setting, based on a data amount of the edges extracted in the intersection extraction step and a data amount of edges in the page that is predicted by analyzing the control information, the threshold for controlling extraction of the edges in the intersection extraction step to fall within a predetermined data amount,
wherein in the setting step, setting of the threshold is controlled in accordance with a remaining capacity storable in a storage unit configured to store information of the edges extracted in the intersection extraction step.

10. The method according to claim 9, wherein in the setting step, in a case where the remaining capacity decreases upon storing, in the storage unit, the information of the edges extracted in the intersection extraction step, the setting of the threshold is updated based on the decrease in the remaining capacity.

11. The method according to claim 9, wherein in the span extraction step, span data containing merge information which is obtained from the fill information and indicates merge of the object and a background to be merged, and the span between the edges is generated.

12. The method according to claim 11, wherein in a case where the rectangular region which surrounds the object is set, and as edges of the object on the scan line, intersections of the rectangular region and the scan line are extracted in the intersection extraction step, fill-in of the span is controlled for the span extracted in the span extraction step, in the fill-in control step based on the merge information contained in the span data.

13. A non-transitory computer-readable storage medium storing a program for causing a computer to execute an image forming apparatus control method defined in claim 7.

14. An image forming apparatus comprising:
a first processor which determines whether the number of edges contained in one scan line exceeds a threshold, and in a case where it is determined that the number of edges contained in one scan line does not exceed the threshold, obtains edge information of an outline of an object, and in a case where it is determined that the number of edges contained in one scan line exceeds the threshold, obtains edge information of a bounding box of the object; and
a second processor which, in a case where the edge information of the outline of the object is obtained, performs rendering without a comparison with a background, and in a case where the edge information of the bounding box of the object is obtained, performs rendering while performing a comparison with the background.

15. An image forming apparatus for rendering an object, comprising:
a determination unit configured to determine whether a number of intersections of an outline of the object and one or more scan lines exceeds a threshold;
an extraction unit configured to extract, as edge positions used for filling in an inside of the outline of the object, intersection positions of a scan line and a rectangular region which surrounds the object in a case where the determination unit determines that the number of intersections exceeds the threshold, and to extract, as edge positions used for filling in an inside of the outline of the object, intersection positions of a scan line and an outline of the object in a case where the determination unit determines that the number of the intersections does not exceed the threshold; and
a fill-in unit configured to render the object by executing fill-in of a span between the edge positions extracted by the extraction unit.

16. The apparatus according to claim 15, wherein the fill-in unit executes the fill-in of the span by merging a background image and an image of the rectangular region which surrounds the object in a case where the determination unit determines that the number of the intersections exceeds the threshold, and
wherein the fill-in unit executes the fill-in of the span by a color associated with edge information of the object in a case where the determination unit determines that the number of the intersections does not exceed the threshold.

17. The apparatus according to claim 15, the apparatus further comprising a unit configured to generate merge information for merging a background image and the rectangular region which surrounds the object in a case where the determination unit determines that the number of the intersections exceeds the threshold,
wherein the fill-in unit executes, in accordance with the merge information, the fill-in of the span by merging a background image and an image of the rectangular region which surrounds the object in a case where the determination unit determines that the number of the intersections exceeds the threshold.

18. The apparatus according to claim 15, the apparatus further comprising:
an input unit configured to input data of the object;
a generation unit configured to generate a display list including edge information of the object from the data input by the input unit; and
a rewrite unit configured to rewrite the edge information included in the display list into edge information that designates extracting, as edge positions, intersection positions of a scan line and a rectangular region which surrounds the object in a case where the determination unit determines that the number of the intersections exceeds the threshold,
wherein the extraction unit extracts edge positions of the object on a scan line in accordance with the edge information of the object.

19. The apparatus according to claim 18, wherein the generation unit generates the display list including edge information that designates extracting, as edge positions, intersection positions of a scan line and an outline of the object.

20. The apparatus according to claim 15, wherein the determination unit determines the number of the intersections by scanning the object.

21. The apparatus according to claim 15, wherein the determination unit determines whether the number of the intersections exceeds the threshold depending on whether the object is a 1- or 2-byte character.

22. The apparatus according to claim 15, wherein the fill-in unit executes, by using a background color, fill-in of an outside of the outline of the object.

23. The apparatus according to claim 15, wherein the determination unit determines whether the object is a binary bitmap, and determines whether the number of the intersections exceeds the threshold in a case where the object is determined as the binary bitmap.

24. An image forming apparatus comprising:
a first processor that determines whether a number of intersections of an outline of an object and one or more scan lines exceeds a threshold, sets a designation for extracting, as edge positions, intersection positions of a scan line and a rectangular region which surrounds the object in a case where the number of the intersections exceeds the threshold, and sets a designation for extracting, as edge positions, intersection positions of a scan line and an outline of the object in a case where the number of the intersections does not exceed the threshold;
a second processor that extracts edge positions of the object on the scan line in accordance with the designation set by the first processor; and
a third processor that renders the object by executing fill-in of a span between the edge positions extracted by the second processor.

25. The apparatus according to claim 24, wherein an operation clock of the first processor is higher than the operation clocks of the second processor and the third processor.

26. An image forming method of rendering an object, the method comprising:
- a determination step of determining whether a number of intersections of an outline of the object and one or more scan lines exceeds a threshold;
- an extraction step of extracting, as edge positions used for filling in an inside of the outline of the object, intersection positions of a scan line and a rectangular region which surrounds the object in a case where the determination step determines that the number of the intersections exceeds the threshold, and extracting, as edge positions used for filling in an inside of the outline of the object, intersection positions of a scan line and an outline of the object in a case where the determination step determines that the number of the intersections does not exceed the threshold; and
- a fill-in step of rendering the object by executing fill-in of a span between the edge positions extracted in the extraction step.

27. The method according to claim 26, wherein the fill-in step executes the fill-in of the span by merging a background image and an image of the rectangular region which surrounds the object in a case where the determination step determines that the number of the intersections exceeds the threshold, and
- wherein the fill-in step executes the fill-in of the span by a color associated with edge information of the object in a case where the determination step determines that the number of the intersections does not exceed the threshold.

28. The method according to claim 26, the method further comprising a step of generating merge information for merging a background image and the rectangular region which surrounds the object in a case where the determination step determines that the number of the intersections exceeds the threshold,
- wherein the fill-in step executes, in accordance with the merge information, the fill-in of the span by merging the background image and the image of the rectangular region which surrounds the object in a case where the determination step determines that the number of the intersections exceeds the threshold.

29. The method according to claim 26, the method further comprising:
- an input step of inputting data of the object;
- a generation step of generating a display list including edge information of the object from the data input in the input step; and
- a rewrite step of rewriting the edge information included in the display list into edge information that designates extracting, as edge positions, intersection positions of a scan line and a rectangular region which surrounds the object in a case where the determination step determines that the number of the intersections exceeds the threshold,
- wherein the extraction step extracts edge positions of the object on a scan line in accordance with the edge information of the object.

30. The method according to claim 29, wherein the generation step generates the display list including edge information that designates extracting, as edge positions, intersection positions of a scan line and an outline of the object.

31. The method according to claim 26, wherein the determination step determines the number of the intersections by scanning the object.

32. The method according to claim 26, wherein the determination step determines whether the number of the intersections exceeds the threshold depending on whether the object is a 1- or 2-byte character.

33. The method according to claim 26, wherein the fill-in step executes, by using a background color, fill-in of an outside of the outline of the object.

34. The method according to claim 26, wherein the determination step determines whether the object is a binary bitmap, and determines whether the number of the intersections exceeds the threshold in a case where the object is determined as the binary bitmap.

35. A non-transitory computer-readable medium storing a program for causing a computer to execute an image forming method of rendering an object, the method comprising:
- a determination step of determining whether a number of intersections of an outline of the object and one or more scan lines exceeds a threshold;
- an extraction step of extracting, as edge positions used for filling in an inside of the outline of the object, intersection positions of a scan line and a rectangular region which surrounds the object in a case where it is determined that the number of the intersections exceeds the threshold, and extracting, as edge positions, intersection positions of a scan line and an outline of the object in a case where it is determined that the number of the intersections does not exceed the threshold; and
- a fill-in step of rendering the object by executing fill-in of a span between the extracted edge positions.

* * * * *